United States Patent [19]
Hart

[11] Patent Number: 5,745,267
[45] Date of Patent: Apr. 28, 1998

[54] APPARATUS FOR MAKING HOLOGRAMS INCLUDING A VARIABLE BEAM SPLITTER ASSEMBLY

[75] Inventor: Stephen J. Hart, San Clemente, Calif.

[73] Assignee: Voxel, Laguna Hills, Calif.

[21] Appl. No.: 698,119

[22] Filed: Aug. 15, 1996

Related U.S. Application Data

[63] Continuation of Ser. No. 323,568, Oct. 17, 1994, Pat. No. 5,592,313, which is a continuation of Ser. No. 982,316, Nov. 27, 1992, abandoned.

[51] Int. Cl.$^6$ .............................. G03H 1/18; G03H 1/28
[52] U.S. Cl. .................................. 359/35; 359/24
[58] Field of Search .................... 359/35, 24, 23, 359/22, 1

[56] References Cited

U.S. PATENT DOCUMENTS

| | | | |
|---|---|---|---|
| 3,542,449 | 11/1970 | Van Ligten | 359/24 |
| 3,560,210 | 2/1971 | Grobin | 359/24 |
| 3,614,426 | 10/1971 | Donzelle | 359/24 |
| 3,652,144 | 3/1972 | Vander Lugt | 359/11 |
| 3,903,360 | 9/1975 | Kamisaka et al. | 359/26 |
| 4,078,177 | 3/1978 | Tiemens | 359/24 |
| 4,749,257 | 6/1988 | Klausz | 349/1 |
| 4,983,004 | 1/1991 | Takeya et al. | 359/1 |
| 5,198,913 | 3/1993 | Toyoda et al. | 359/1 |
| 5,260,815 | 11/1993 | Takizawa et al. | 349/25 |
| 5,317,435 | 5/1994 | Kasazumi et al. | 359/35 |

FOREIGN PATENT DOCUMENTS

| | | | |
|---|---|---|---|
| 2140170 | 5/1984 | United Kingdom | 359/24 |

OTHER PUBLICATIONS

A.P. Yakimovich, "Three–dimensional holographic display", Sov. J. Quantum Elect. 11(1), pp. 78–81, Jan. 1981.
E.G. Nassimbene et al, "Reducing noise in holograms", I.B.M. Tech. Dis. Bull. vol. 8, No. 10, p. 1396, Mar. 1966.
H. Nomura et al, "Storage density limitation of a volume-–type hologram memory:theory", Applied Optics, vol. 15, No. 2, pp. 550–555, Feb. 1976.
K. Johnson et al, "Multiple storage of holograms in an organic medium", Applied Physics Letters, vol. 28, No. 9, pp. 506–507, Dec. 1985.
R. A. Bartolini et al, "Multiple storage of holograms in an organic medium", Applied Physics Letters, vol. 28, No. 9, pp. 506–507, May 1976.
W. J. Burke et al, "crosstalk noise from multiple thick–phase holograms", J. Appl. Phys., vol. 48, No. 2, pp. 681–685, Feb. 1977.
"3–Dimensional Illustration By Multiply Exposed Hologram", M. Suzuki, et al., *SPIE*, vol. 523 Applicatios of Holography (1985), pp. 38–41.

*Primary Examiner*—Jon W. Henry
*Attorney, Agent, or Firm*—Snell & Wilmer L.L.P.

[57] ABSTRACT

A method and apparatus for making holograms includes a technique for exposing a film substrate or other light-sensitive medium to consecutive two dimensional images, together representative of a physical three-dimensional system, to generate a three dimensional hologram of the physical system. Low beam ratios are employed to superimpose multiple (20–300) images on the substrate. Each image is relatively weak, but the combination of the series of weak images ultimately appears as a single clearly defined hologram.

21 Claims, 9 Drawing Sheets

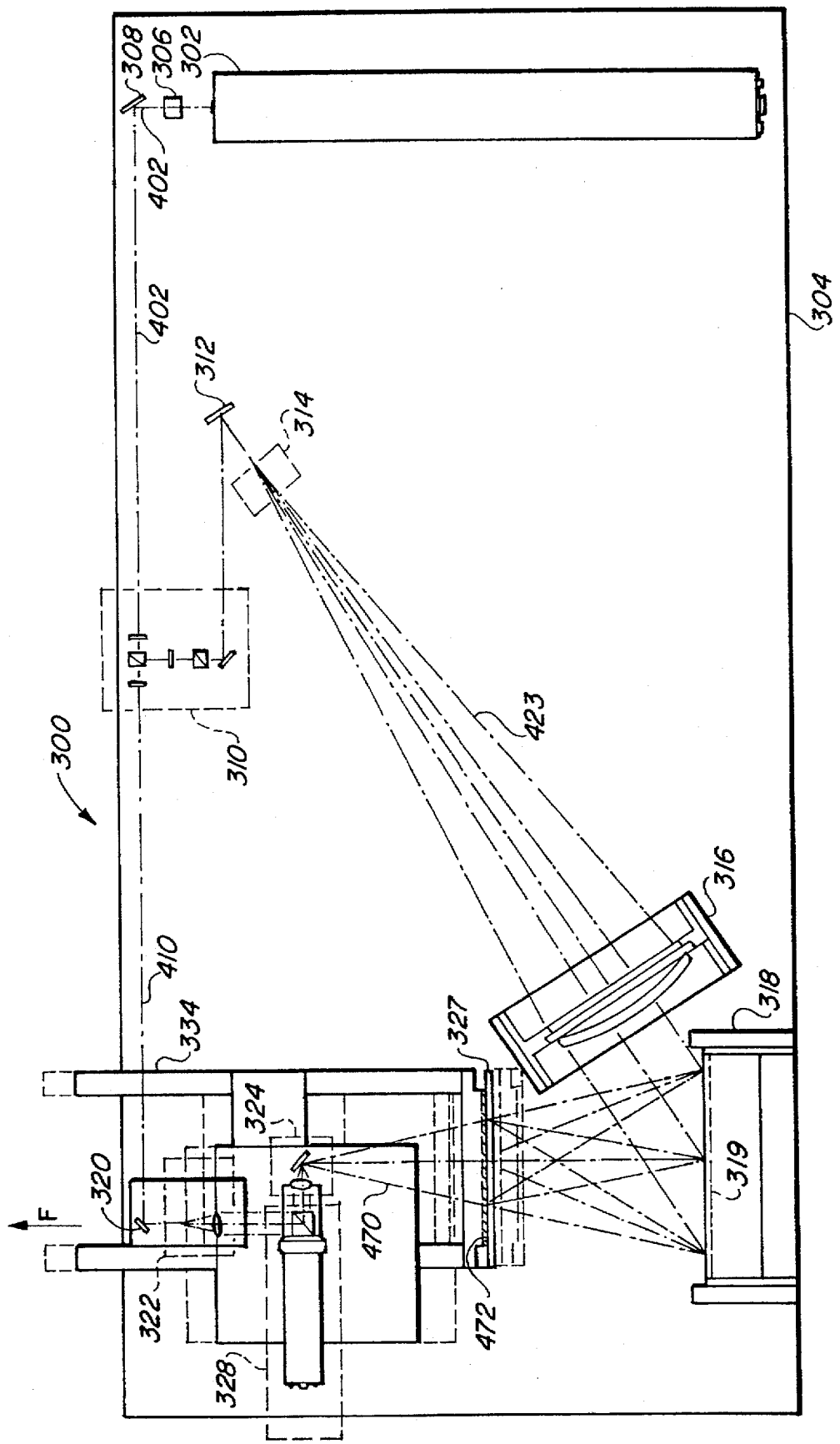

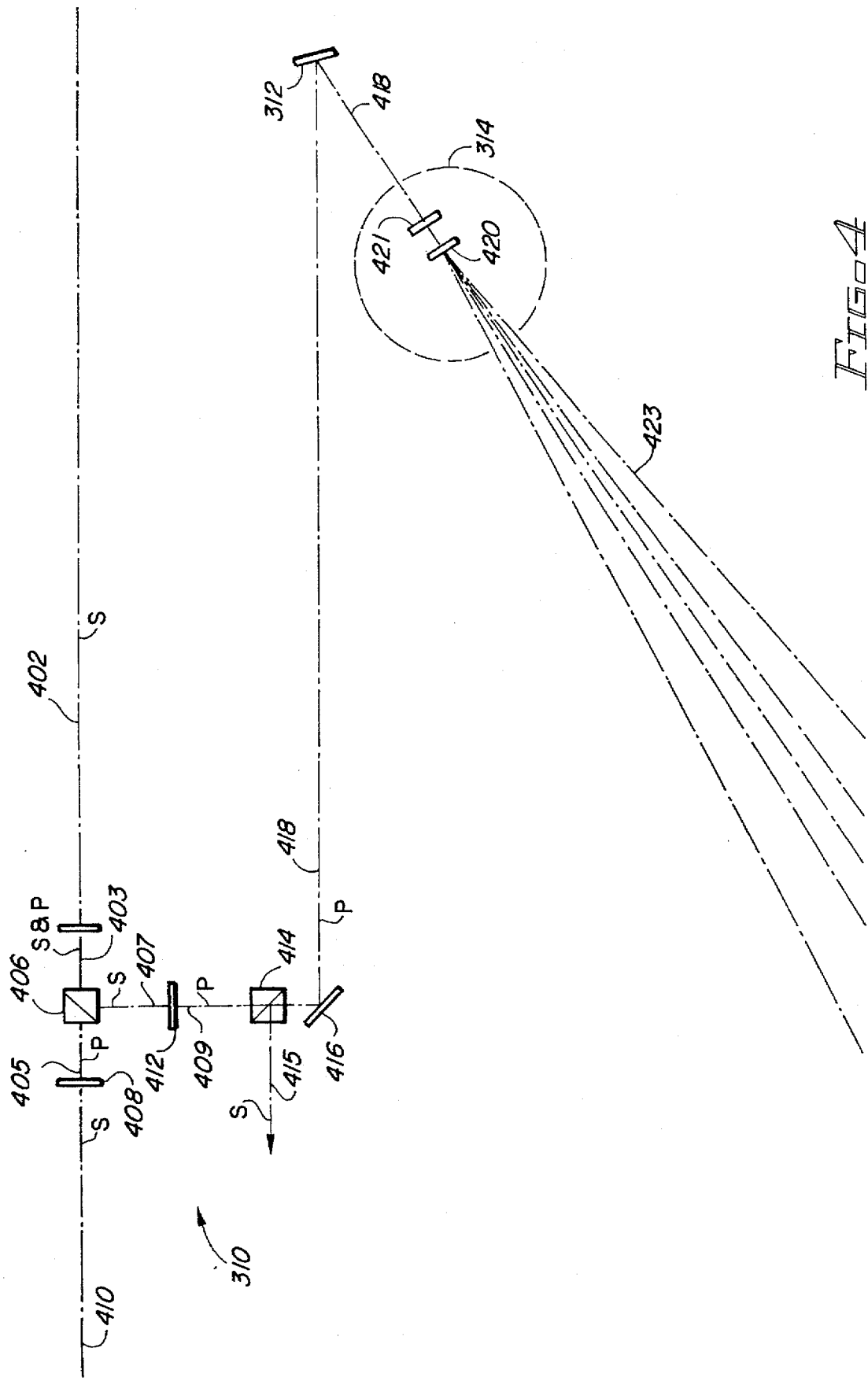

APPARATUS FOR MAKING HOLOGRAMS INCLUDING A VARIABLE BEAM SPLITTER ASSEMBLY

REFERENCE TO RELATED DOCUMENTS

This application is a continuation, according to 37 CFR 1.60, of a previous FWC application filed in the United States Patent and Trademark Office by Stephen J. Hart on Oct. 17, 1994, of the same title and assigned Ser. No. 08/323,568, now U.S. Pat. No. 5,592, 313. Application Ser. No. 08/323,568 is itself a FWC of a previous application filed in the United States Patent and Trademark Office by Stephen J. Hart on Nov. 27, 1992, of the same title and assigned Ser. No. 07/982,316, abandoned.

TECHNICAL FIELD

The present invention relates, generally, to methods and apparatus for making holograms, and more particularly to a technique for sequentially exposing a film substrate to a plurality of two-dimensional images representative of a three-dimensional physical system to thereby produce a hologram of the physical system.

BACKGROUND ART AND TECHNICAL PROBLEMS

A hologram is a three-dimensional record, e.g., a film record of a physical system which, when replayed, produces a true three-dimensional image of the system. Holography differs from stereoscopic photography in that the holographic image exhibits full parallax by affording an observer a full range of viewpoints of the image from every angle, both horizontal and vertical, and full perspective, i.e. it affords the viewer a full range of perspectives of the image from every distance from near to far. A holographic representation of an image thus provides significant advantages over a stereoscopic representation of the same image. This is particularly true in medical diagnosis, where the examination and understanding of volumetric data is critical to proper medical treatment.

While the examination of data which fills a three-dimensional space occurs in all branches of art, science, and engineering, perhaps the most familiar examples involve medical imaging where, for example, Computerized Axial Tomography (CT or CAT), Magnetic Resonance (MR), and other scanning modalities are used to obtain a plurality of cross-sectional images of a human body part. Radiologists, physicians, and patients observe these two-dimensional data "slices" to discern what the two-dimensional data implies about the three-dimensional organs and tissue represented by the data. The integration of a large number of two-dimensional data slices places great strain on the human visual system, even for relatively simple volumetric images. As the organ or tissue under investigation becomes more complex, the ability to properly integrate large amounts of two-dimensional data to produce meaningful and understandable three-dimensional mental images may become overwhelming.

Other systems attempt to replicate a three-dimensional representation of an image by manipulating the "depth cues" associated with visual perception of distances. The depth cues associated with the human visual system may be classified as either physical cues, associated with physiological phenomena, or psychological cues, which are derived by mental processes and predicated upon a person's previous observations of objects and how an object's appearance changes with viewpoint.

The principal physical cues involved in human visual perception include: (1) accommodation (the muscle driven change in focal length of the eye to adapt it to focus on nearer or more distant objects) ; (2) convergence (the inward swiveling of the eyes so that they are both directed at the same point); (3) motion parallax (the phenomenon whereby objects closer to the viewer move faster across the visual field than more distant objects when the observer's eyes move relative to such objects) ; and (4) stereo-disparity (the apparent difference in relative position of an object as seen by each eye as a result of the separation of the two eyes). The principal psychological cues include: (1) changes in shading, shadowing, texture, and color of an object as it moves relative to the observer; (2) obscuration of distant objects blocked by closer objects lying in the same line of sight; (3) linear perspective (a phenomenon whereby parallel lines appear to grow closer together as they recede into the distance); and (4) knowledge and understanding which is either remembered or deduced from previous observations of the same or similar objects.

The various psychological cues may be effectively manipulated to create the illusion of depth. Thus, the brain can be tricked into perceiving depth which does not actually exist. However, the physical depth cues are not subject to such manipulation; the physical depth cues, while generally limited to near-range observation, accurately convey information relating to an image. For example, the physical depth cues are used to perceive depth when looking at objects in a small room. The psychological depth cues however, must be employed to perceive depth when viewing a photograph or painting (i.e. a planar depiction) of the same room. While the relative positions of the objects in the photograph may perhaps be unambiguously perceived through the psychological depth cues, the physical depth cues nonetheless continue to report that the photograph or painting is merely a two-dimensional representation of a three-dimensional space.

Stereo systems depend on image pairs each produced at slightly different perspectives. The differences in the images are interpreted by the visual system (using the psychological cues) as being due to relative size, shape, and position of the objects and thus create the illusion of depth. A hologram, on the other hand, does not require the psychological cues to overrule the physical depth cues in order to create the illusion of a three-dimensional image; rather, a hologram produces an actual three-dimensional image.

Conventional holographic theory and practice teach that a hologram is a true three-dimensional record of the interaction of two beams of coherent, i.e. mutually correlated light, in the form of a microscopic pattern of interference fringes. More particularly, a reference beam of light is directed at the film substrate at a predetermined angle with respect to the film. An object beam, which is either reflected off of or shines through the object to be recorded, is generally normally (orthogonally) incident to the film. The reference and object beams interact within the volume of space occupied by the film and, as a result of the coherent nature of the beams, produce a standing (static) wave pattern within the film. The standing interference pattern selectively exposes light sensitive elements within the photographic emulsion comprising the film, resulting in a pattern of alternating light and dark lines known as interference fringes. The fringe pattern, being a product of the standing wave front produced by the interference between the reference and object beams, literally encodes the amplitude and phase information of the standing wave front. When the hologram is properly re-illuminated, the amplitude and phase information encoded in the fringe pattern is replayed in free space, producing a true three-dimensional image of the object.

Conventional holographic theory further suggests that a sharp, well defined fringe pattern produces a sharp, bright hologram, and that an overly strong object beam will act like one or more secondary reference beams causing multiple fringe patterns to form (intermodulation) and diluting the strength of the primary fringe pattern. Accordingly, holographers typically employ a reference beam having an amplitude at the film surface approximately five to eight times that of the object beam to promote the formation of a single high contrast pattern within the interference fringe pattern and to reduce spurious noise resulting from bright spots associated with the object. Moreover, since known holographic techniques generally surround the recording of a single hologram or, alternatively, up to two or three holograms, within a single region of the emulsion comprising film substrate, the stated objective is to produce the strongest fringe pattern possible to ensure the brightest holographic display. Accordingly, holographers typically attempt to expose a large number of photosensitive grains within the film emulsion while the object is being exposed. Since every point within the holographic film comprises part of a fringe pattern which embodies information about every visible point on the object, fringe patterns exist throughout the entire volume of the film emulsion, regardless of the configuration of the object or image which is the subject of the hologram. Consequently, the creation of strong, high contrast fringe patterns necessarily results in rapid consumption of the finite quantity of photosensitive elements within the emulsion, thereby limiting the number of high contrast holograms which can be produced on a single film substrate to two or three. Some holographers have suggested that as many as 10 to 12 different holographic images theoretically may be recorded on a single film substrate; however, heretofore, superimposing more than a small finite number of holograms has not been recognized and, in fact, has not been possible in the context of conventional hologram theory.

In prior art holograms employing a small number of superimposed holographic images on a single film substrate, the existence of a relatively small percentage of spurious exposed and/or developed photosensitive elements (fog) does not appreciably degrade the quality of the resulting hologram. In contrast, holograms made in accordance with the subject invention, discussed below, typically employ up to 100 or more holograms superimposed on a single film substrate; hence, the presence of a small amount of fog on each hologram would have a serious cumulative effect on the quality of the final product.

A method and apparatus for producing holograms is therefore needed which permits a large number, for example several hundred or more different holograms, to be recorded on a single film substrate, thereby facilitating the true, three-dimensional holographic reproduction of human body parts and other physical systems which are currently viewed in the form of discrete data slices.

SUMMARY OF THE INVENTION

The present invention provides methods and apparatus for making holograms which overcome the limitations of the prior art.

In accordance with one aspect of the present invention, a hologram camera assembly comprises a single laser source and a beam splitter configured to split the laser beam into a reference beam and an object beam and to direct both beams at a film substrate. The assembly further comprises a spatial light modulator configured to sequentially project a plurality of two-dimensional images, for example a plurality of slices of data comprising a CT scan data set, into the object beam and onto the film. In this manner, a three-dimensional holographic record of each two-dimensional slice of the data set is produced on the film.

In accordance with another aspect of the invention, the entire data set, consisting of one to two hundred or more individual two-dimensional slices, is superimposed onto the film, resulting in the superposition of one hundred or more individual, interrelated holograms on the single substrate (the master hologram). In contrast to prior art techniques wherein a small number (e.g., one to four) of holograms are superimposed onto a single film substrate, the present invention contemplates methods and apparatus for recording a large number of relatively weak holograms, each consuming an approximately equal, but in any event proportionate, share of the photosensitive elements within the film.

In accordance with a further aspect of the invention, a copy (transfer) assembly is provided whereby the aforementioned master hologram may be quickly and efficiently reproduced in a single exposure as a single hologram.

In accordance with yet a further aspect of the invention, a reference to object beam ratio of approximately unity is employed in making the master hologram, thereby conserving the number of photo-sensitive elements (e.g., silver halide crystals) which are usefully converted for each two-dimensional data slice. Moreover, careful control over various process parameters, including the coherence, polarization, and scattering of the laser beam, as well as the exposure time and the grey level value of the data, permit each individual hologram comprising the master hologram to consume (convert) a quantity of silver halide crystals within the emulsion in proportion to, among other things, the number of data slices comprising the data set.

In accordance with yet a further aspect of the invention, a hologram viewing device is provided for viewing the hologram produced in accordance with the invention. In particular, an exemplary viewing box in accordance with the present invention comprises a suitably enclosed, rectangular apparatus comprising a broad spectrum light source, e.g., a white light source mounted therein, a collimating (e.g., Fresnel) lens, a diffraction grating, and a Venetian blind (louver). The collimating lens is configured to direct a collimated source of white light through the diffraction grating. In the context of the present invention, a collimated light refers to light in which all components thereof have the same direction of propagation such that the beam has a substantially constant cross-sectional area over a reasonable propagation length.

The diffraction grating is configured to pass light therethrough at an angle which is a function of the wavelength of each light component. The hologram also passes light therethrough at respective angles which are a function of the corresponding wavelengths. By inverting the hologram prior to viewing, all wavelengths of light thus emerge from the hologram with respect to the grating substantially orthogonally thereto.

DRAWING FIGURES

The subject invention will hereinafter be described in conjunction with the appended drawing figures, wherein like numerals denote like elements, and:

Figure 8:
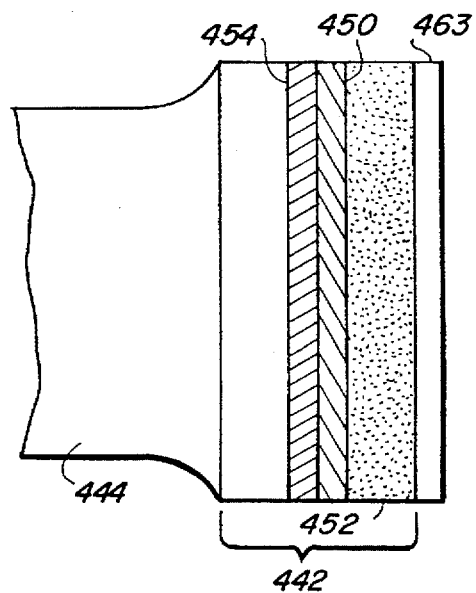
Figure 11:
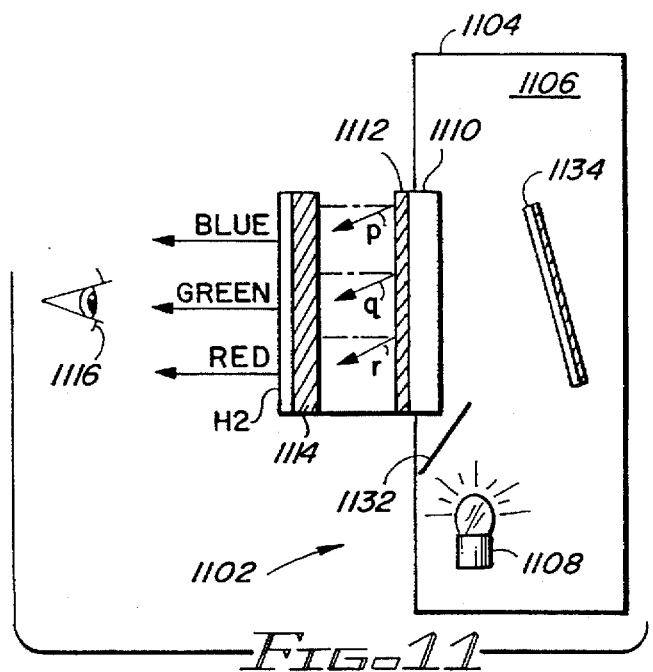
Figure 2A:
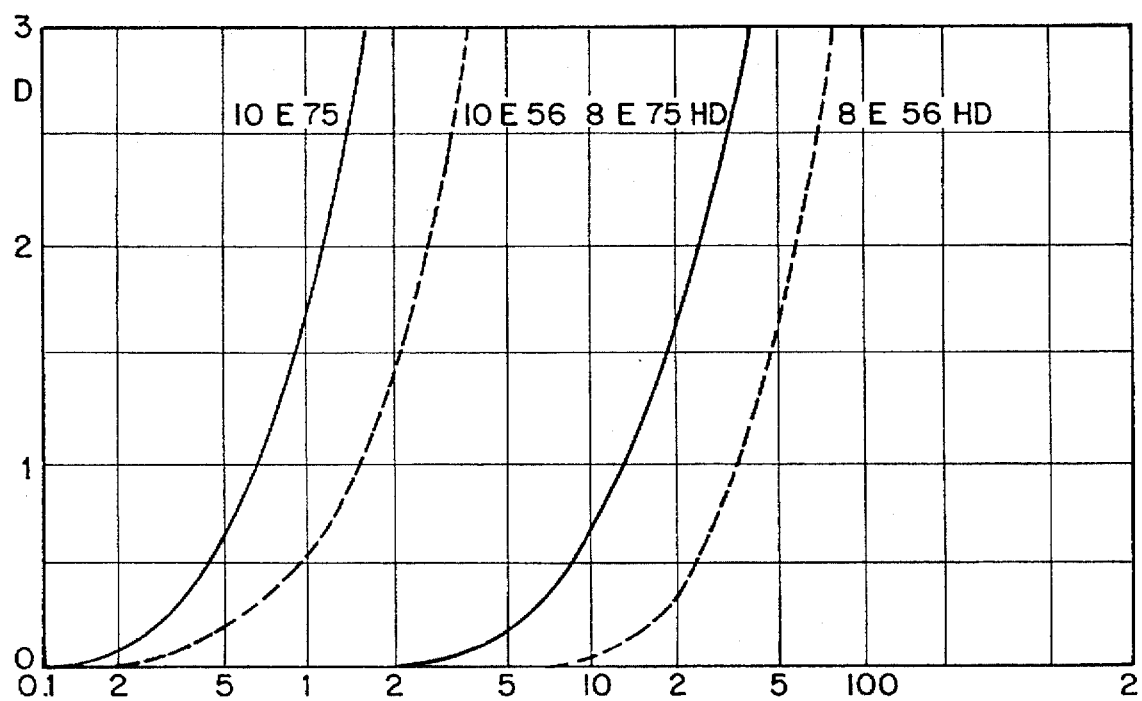
Figure 2B:
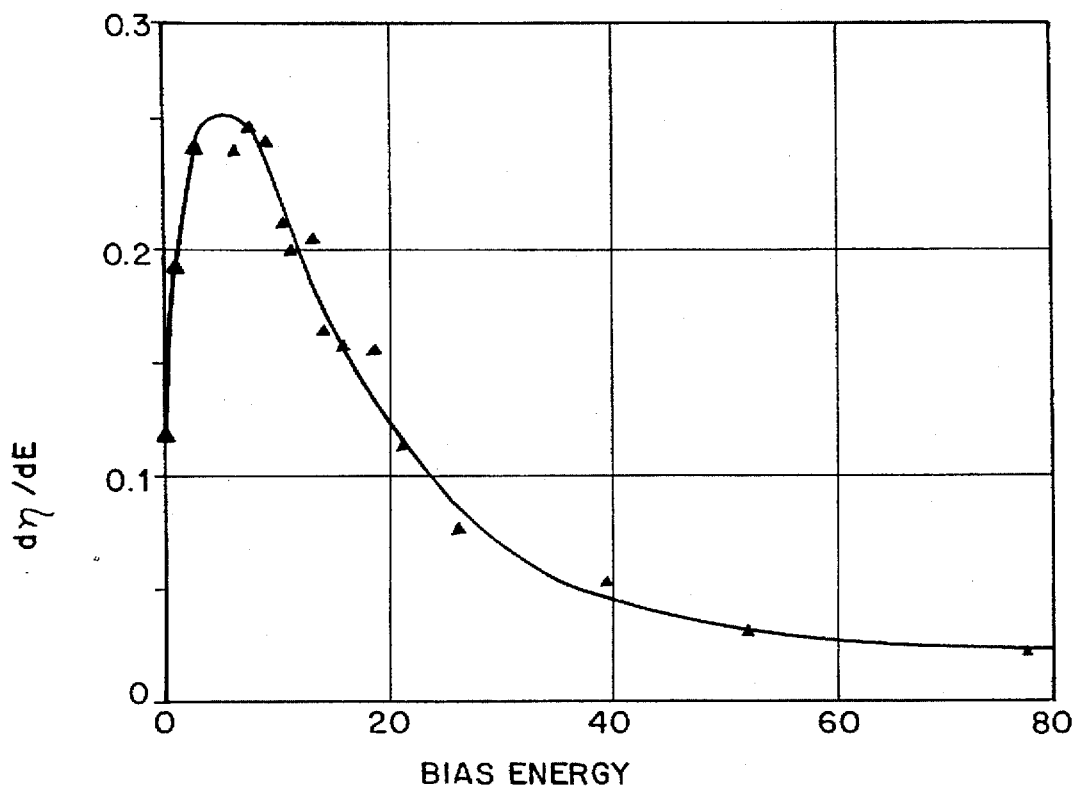
Figure 6:
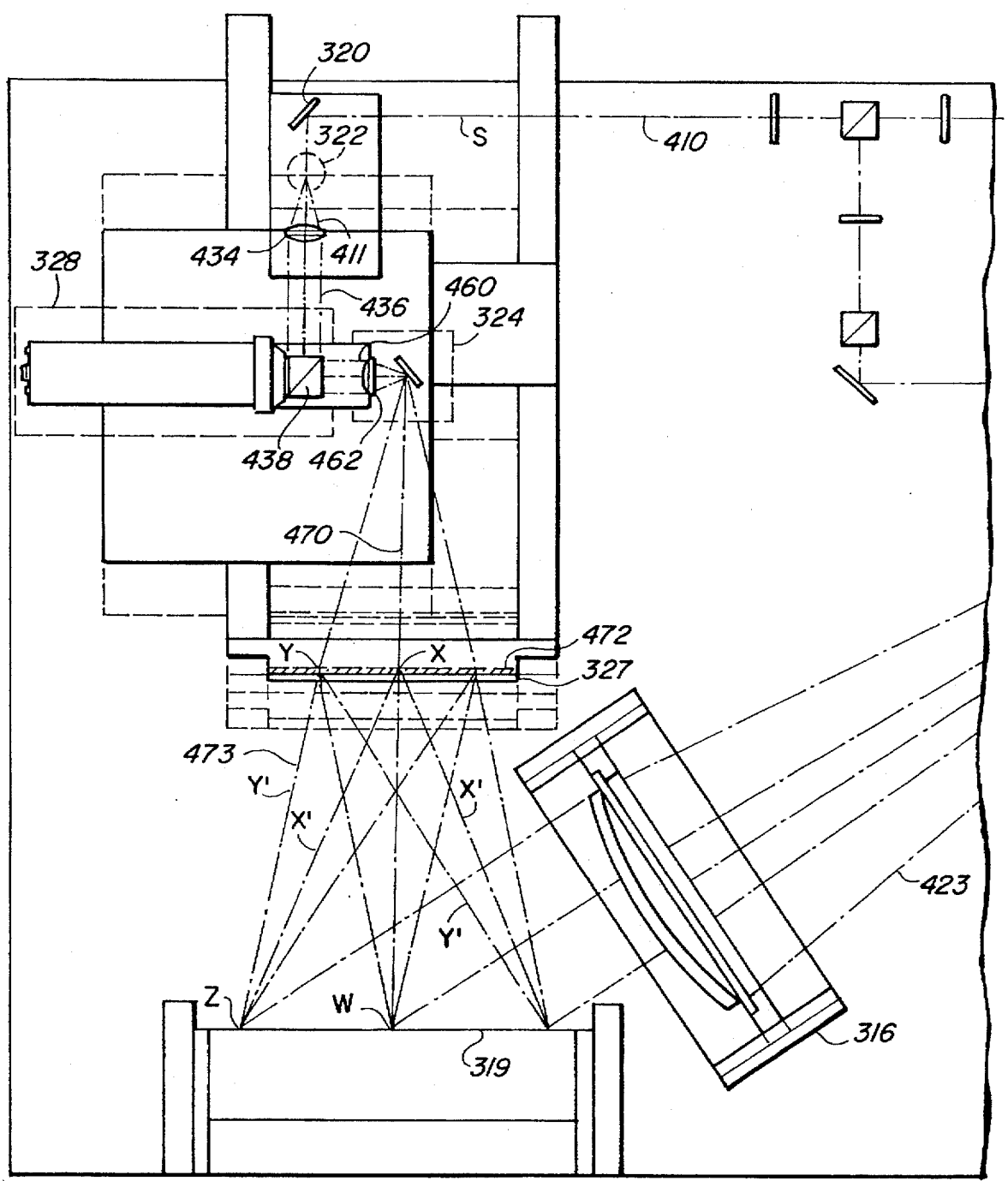
Figure 7:
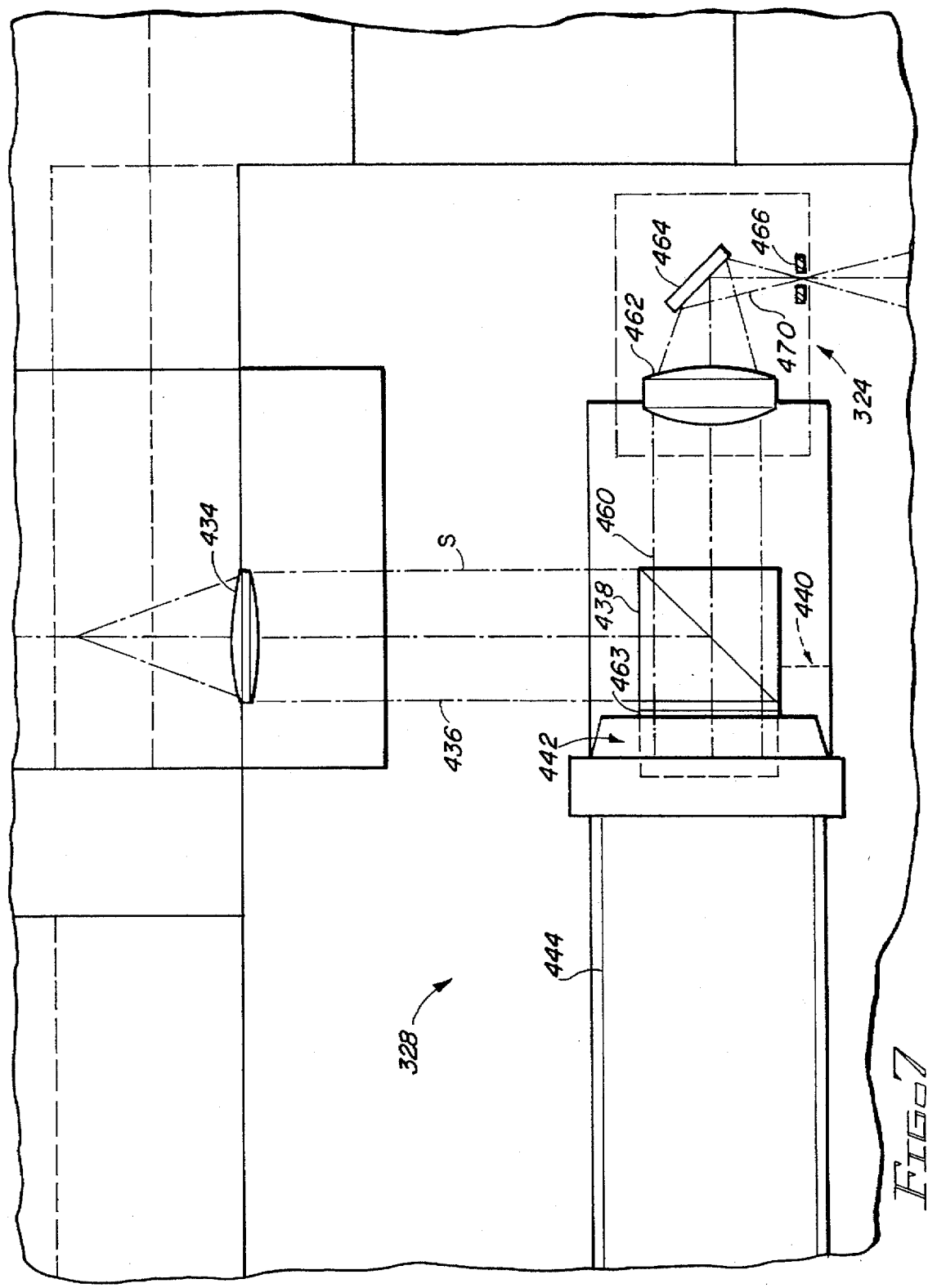
Figure 9:
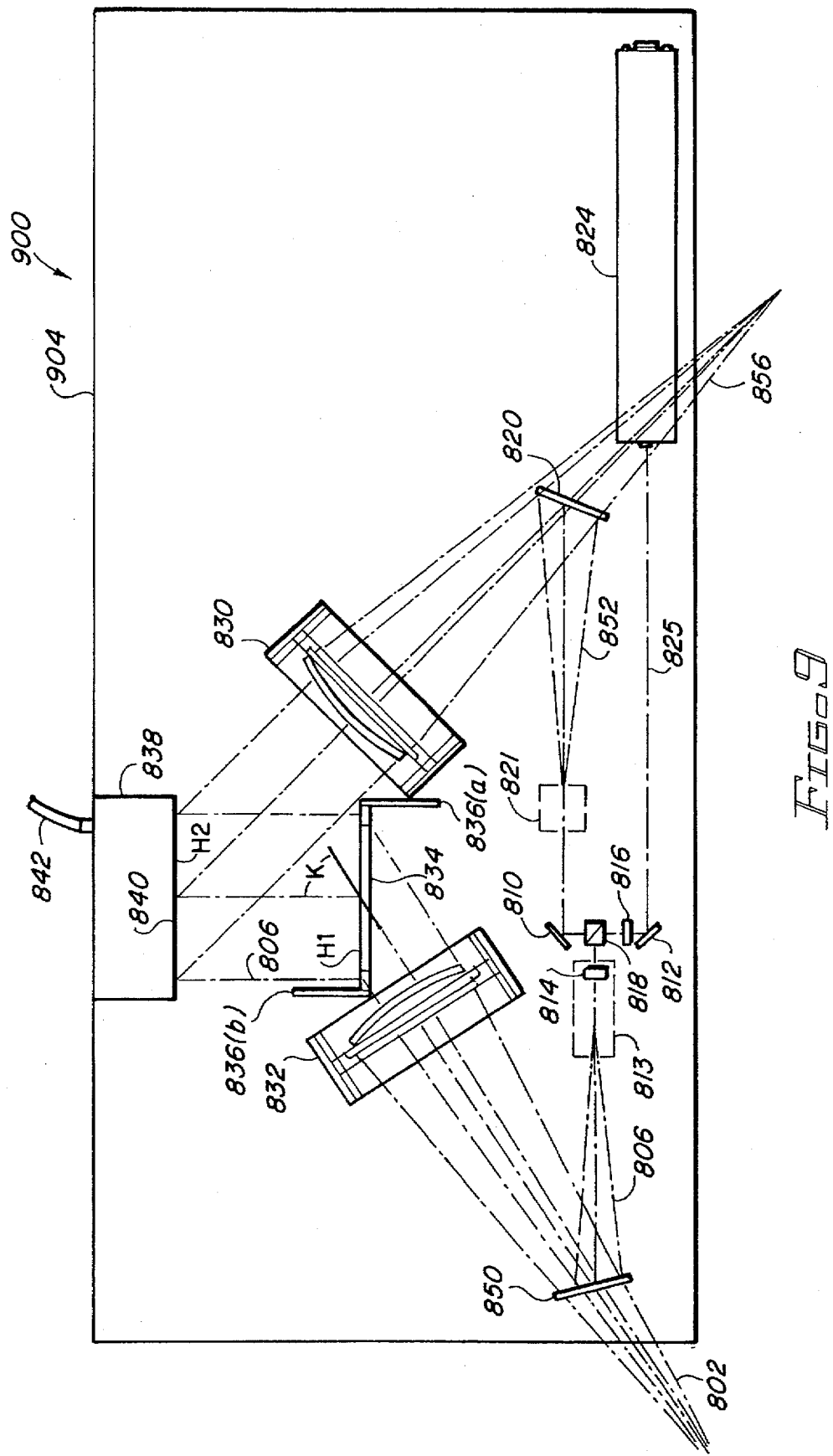
Figure 10A:
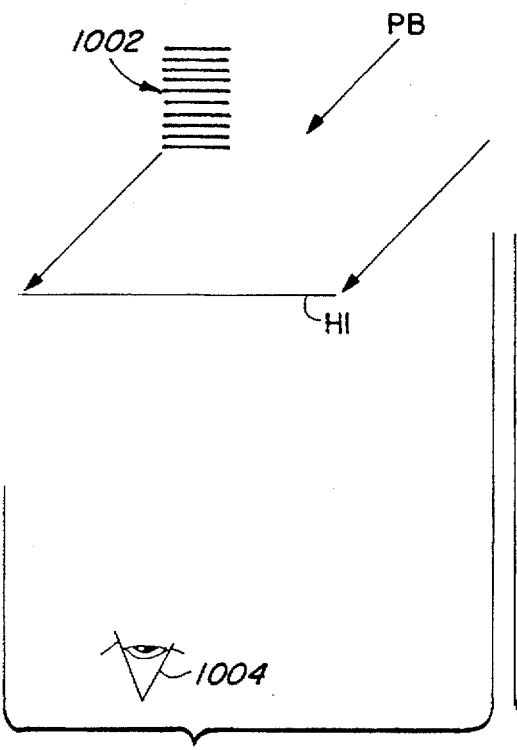
Figure 10B:
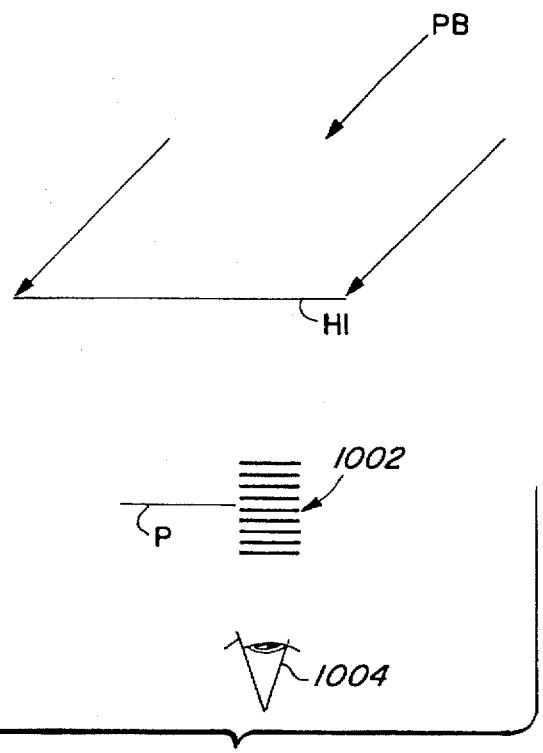

FIG. 2A sets forth a conventional HD graph for typical holographic film samples;

FIG. 2B sets forth a graph of diffraction efficiency as a function of bias energy in accordance with one aspect of the present invention;

FIG. 3 shows a schematic diagram of a camera system in accordance with a preferred embodiment of the present invention;

FIG. 4 shows a schematic diagram of a beam splitter assembly in accordance with a preferred embodiment of the present invention;

FIG. 5A to 5D are graphic illustrations showing the effect of Fourier transforming of the laser beam utilized in the camera system of FIG. 3;

FIG. 6 shows an enlarged schematic diagram of a portion of the camera system of FIG. 3;

FIG. 7 shows an enlarged schematic diagram of another portion of the camera system of FIG. 3;

FIG. 8 shows an enlarged schematic diagram of a portion of the projection assembly utilized in the camera assembly of FIG. 3;

FIG. 9 shows a schematic layout of an exemplary copy rig in accordance with the present invention;

FIGS. 10A and 10B set forth orthoscopic and pseudoscopic views, respectively, of a master hologram being replayed in accordance with one aspect of the present invention;

FIG. 11 shows a schematic diagram of a hologram viewing apparatus; and

FIGS. 12A–D schematically illustrate fringe patterns associated with transmission and reflection holograms, respectively.

DETAILED DESCRIPTION OF PREFERRED EXEMPLARY EMBODIMENTS

In the context of the present invention, a volumetric data set corresponding to a three-dimensional physical system (e.g., a human body part) is encoded onto a single recording material, e.g., photographic substrate, to thereby produce a master hologram of the object. The master hologram may be used to produce one or more copies which, when replayed by directing an appropriate light source therethrough, recreates a three-dimensional image of the object exhibiting full parallax and full perspective. Thus, for a particular data set, the present invention contemplates a plurality of separate, interrelated optical systems: a camera system for producing a master hologram; a copy system for generating copies of the master hologram; and a viewing system for replaying either the master hologram or copies thereof.

THE DATA SET

Presently known modalities for generating volumetric data corresponding to a physical system include, inter alia, computerized axial tomography (CAT or CT) scans, magnetic resonance scans (MR), three-dimensional ultra sound (US), positron emission tomography (PET), and the like.

Although a preferred embodiment of the present invention is described herein in the context of medical imaging systems which are typically used to investigate internal body parts (e.g., the brain, spinal cord, and various other bones and organs), those skilled in the art will appreciate that the present invention may be used in conjunction with any suitable data set defining any three-dimensional distribution of data, regardless of whether the data set represents a physical system, e.g., numerical, graphical, and the like.

Referring now to FIGS. 1A–D, a typical CT device comprises a gantry 10 and a table 12, as is known in the art. Table 12 is advantageously configured to move axially (along arrow A in FIG. 1) at predetermined increments. A patient (not shown) is placed on table 12 such that the body part to be interrogated is generally disposed within the perimeter of gantry 10.

Gantry 10 suitably comprises a plurality of x-ray sources and recording devices (both not shown) disposed about its circumference. As the patient is moved axially relative to gantry 10, the x-ray devices record a succession of two-dimensional data slices 14A, 14B, . . . 14X comprising the three-dimensional space (volume) 16 containing data obtained with respect to the interrogated body part (see FIG. 1B). That is, the individual data slices 14 combine to form a volumetric data set 16 which, in total, comprises a three-dimensional image of the interrogated body part. As used herein, the terms "volume" or "volumetric space" refers to volumetric data set 16, including a plurality of two-dimensional data slices 14, each slice containing particular data regarding the body part interrogated by the given modality.

Typical data sets comprise on the order of 10 to 70 (for CT systems) or 12 to 128 (for MR) two-dimensional data slices 14. those skilled in the art will appreciate that the thickness and spacing between data slices 14 are configurable and may be adjusted by the CT technician. Typical slice thicknesses range from 1.5 to 10 millimeters and most typically approximately 5 millimeters. The thickness of the slices is desirably selected so that only a small degree of overlap exists between each successive data slice.

The data set corresponding to a CT or MR scan is typically reproduced in the form of a plurality (e.g., 50–100) of two-dimensional transparent images which, when mounted on a light box, enable the observer (e.g., physician) to view each data slice. By reviewing a plurality of successive data slices 14, the observer may construct a three-dimensional mental image or model of the physical system within volume 16. The accuracy of the three-dimensional model constructed in the mind of the observer is a function of the level of skill, intelligence, and experience of the observer and the complexity and degree of abnormality of the body parts within volume 16.

Figure 1A:
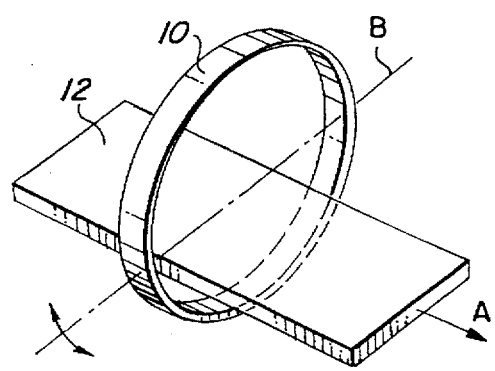
FIG. 1A shows a typical computerized axial tomography (CT) device.
Figure 1B:
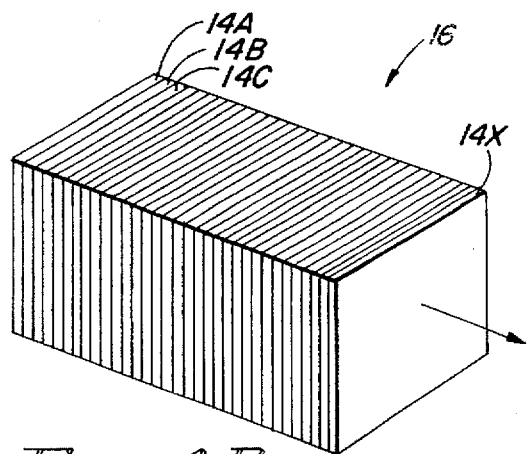
FIG. 1B shows a plurality of two-dimensional data slices each containing data such as may be obtained by x-ray devices typically employed in the CT device of FIG. 1A, the slices cooperating to form a volumetric data set.
Figure 1C:
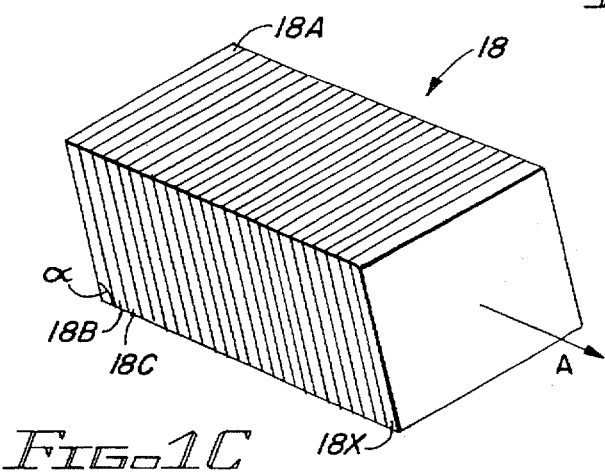
FIG. 1C shows an alternative volumetric data set obtained through use of an angled gantry.

In certain circumstances it may be desirable to tilt gantry 10 about its horizontal axis B such that the plane of gantry 10 forms a preselected angle, for example angle α, with respect to the axis of travel of table 12 for some or all data slices. With particular reference to FIG. 1C, use of an angled gantry produces a data set corresponding to an alternate volume 18 comprising a plurality of data slices 18A, 18B, 18C, . . . 18X, where X corresponds to the number of data slices and wherein the plane of each data slice forms an angle (α) with respect to axis A. In circumstances where the interrogated body part is adjacent to a radiation sensitive physiological structure (e.g., the eyes), the use of an angled gantry permits data to be gathered without irradiating the closely proximate radiation sensitive material.

In addition to the use of an angled gantry, other techniques may be employed to produce a data set in which a plane of each data slice is not necessarily parallel to the plane of every other data slice, or not necessarily orthogonal to the axis of the data set; indeed, the axis of the data set may not necessarily comprise a straight line. For example, certain computerized techniques have been developed which artificially manipulate the data to produce various perspectives and viewpoints of the data, for example, by graphically rotating the data. In such circumstances, it is nonetheless possible to replicate the three-dimensional data set in the context of the present invention. In particular, by carefully coordinating the angle at which the object beam is projected onto the film, the plane of a particular data slice may be properly oriented with respect to the plane of the other data slices and with respect to the axis of the data set, for example by tilting screen 326 about its horizontal or vertical axis.

Figure 1D:
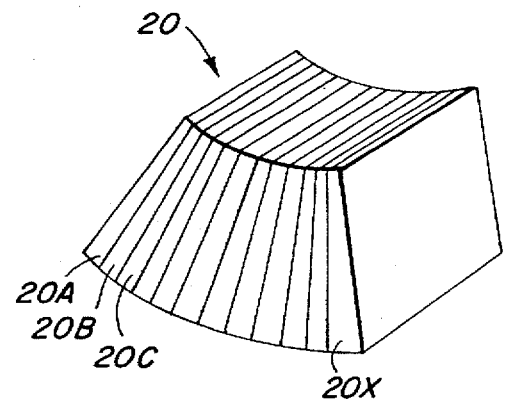
FIG. 1D shows yet another volumetric data set such as is typically obtained from an ultrasound device.

With momentary reference to FIG. 1D, a typical ultrasound data set 20 comprises a plurality of data slices 20A, 20B, 20C . . . 20X defining a fan-out volumetric space.

Virtually any suitable volumetric configuration may be defined by a data set in the context of the present invention. Thus, while each data slice may not necessarily be parallel to every other data slice comprising a particular data set, fairly accurate images may be produced provided each data slice is substantially parallel to its adjacent slice. Further, those skilled in the art will know that computer programs can be used to reformat data sets to provide parallel slices in planes other than the acquisition plane of the scanner.

Presently known CT scan systems generate data slices having a resolution defined by, for example, a 256 or a 512 square pixel matrix. Furthermore, each address within the matrix is typically defined by a twelve bit grey level value. CT scanners are conventionally calibrated in Houndsfield Units whereby air has a density of minus 1,000 and water a density of zero. Thus, each pixel within a data slice may have a grey level value between minus 1,000 and 3,095 (inclusive) in the context of a conventional CT system. Because the human eye is capable of simultaneously perceiving a maximum of approximately one hundred (100) grey levels between pure white and pure black, it is desirable to manipulate the data set such that each data point within a slice exhibits one (1) of approximately fifty (50) to one hundred (100) grey level values (as opposed to the 4,096 available grey level values). The process of redefining these grey level values is variously referred to as "windowing" (in radiology); "stretching" (in remote sensing/satellite imaging); and "photometric correction" (in astronomy).

The present inventor has determined that optimum contrast may be obtained by windowing each data slice in accordance with its content. For example, in a CT data slice which depicts a cross-section of a bone, the bone being the subject of examination, the relevant data will typically exhibit grey level values in the range of minus 600 to 1,400. Since the regions of the data slice exhibiting grey level values less than minus 600 or greater than 1,400 are not relevant to the examination, it may be desirable to clamp all grey level values above 1,400 to a high value corresponding to pure white, and those data points having grey level values lower than minus 600 to a low value corresponding to pure black.

As a further example, normal grey level values for brain matter are typically in the range of about 40 while grey level values corresponding to tumorous tissue may be in the 120 range. If these values were expressed within a range of 4,096 grey level values, it would be extremely difficult for the human eye to distinguish between normal brain and tumorous tissue. Therefore, it may be desirable to clamp all data points having grey level values greater than, e.g., 140, to a very high level corresponding to pure white, and to clamp those data points having grey scale values of less than, e.g., minus 30, to a very low value corresponding to pure black. Windowing the data set in this manner contributes to the production of sharp, unambiguous holograms.

In addition to windowing a data set on a slice-to-slice basis, it may also be advantageous, under certain circumstances, to perform differential windowing within a particular slice, i.e. from pixel to pixel. For example, a certain slice or series of slices may depict a deep tumor in a brain, which tumor is to be treated with radiation therapy, for example by irradiating the tumor with one or more radiation beams. In regions which are not to be irradiated, the slice may be windowed in a relatively dark manner. In regions which will have low to mid levels of radiation, a slice may be windowed somewhat more brightly. In regions of a high concentration of radiation, the slice may be windowed even brighter. Finally, in regions actually containing the tumor, the slice may be windowed the brightest. In the context of the present invention, the resulting hologram produces a ghostly image of the entire head, a brighter brain region, with the brightest regions being those regions which are either being irradiated (if the data set was taken during treatment) or which are to be irradiated.

Another step in preparing the data set involves cropping, whereby regions of each data slice or even an entire data slice not germane to the examination are simply eliminated. Cropping of unnecessary data also contributes to the formation of sharp, unambiguous holograms.

More particularly, each point within the volume of the emulsion exhibits a microscopic fringe pattern corresponding to the entire holographic image from a unique viewpoint. Stated another way, an arbitrary point at the lower left hand corner of a holographic film comprises an interference fringe pattern which encodes the entire holographic image as the image is seen from that particular point. Another arbitrary point on the holographic film near the center of the film will comprise an interference fringe pattern representative of the entire holographic image when the image is viewed from the center of the film. These same phenomena hold true for every point on the hologram. As briefly discussed above, a suitable photographic substrate preferably comprises a volume of photographic emulsion which adheres to the surface of a plastic substrate, for example triacetate. The emulsion typically comprises a very large number of silver halide crystals (grains) suspended in a gelatinous emulsion. Inasmuch as the emulsion contains a finite quantity of crystals, the elimination of unnecessary data (cropping) within a data slice ensures that substantially all of the silver halide grains which are converted (exposed) for each data slice corresponding to the relevant data from each slice. By conserving the number of silver halide grains which are converted for each data slice, a greater number of slices may be recorded onto a particular piece of film.

THE CAMERA SYSTEM

Once a data set is properly prepared (e.g., windowed and cropped), an individual hologram of each respective data slice is superimposed onto a single film substrate to generate a master hologram. In accordance with a preferred embodiment, each individual hologram corresponding to a particular data slice is produced while the data corresponding to a particular slice is disposed at a different distance from the film substrate, as discussed in greater detail below.

Referring now to FIGS. 3-4, a camera system 300 in accordance with the present invention suitably comprises a laser light source 302, a shutter 306, a first mirror 308, a beam splitting assembly 310, a second mirror 312, a reference beam expander 314, a collimating lens 316, a film holder 318, a third mirror 320, an object beam expander 322, an imaging assembly 328, a projection optics assembly 324, a rear projection screen 326 comprising a diffusing surface 472 having a polarizer 327 mounted thereto, and a track assembly 334. In this regard, diffuser 472 may comprise any convenient diffuser made from, e.g. plastic, glass, film or the like. Furthermore, if diffuser 472 comprises a self-polarizing element (e.g. a holographic optical element (HOE)), polarizer 327 may be eliminated to the extent diffuser 472 is self-polarizing. Imaging assembly 328, projection optics assembly 324, and rear projection screen 326 are suitably rigidly mounted to track assembly 334 so that they move in unison as track assembly 334 is moved axially along the line indicated by arrow F. As discussed in greater detail below, track assembly 334 is advantageously configured to replicate the relative positions of data slices comprising the subject of the hologram. In a preferred embodiment, total travel of track assembly 334 is suitably sufficient to accommodate the actual travel of the particular scanning modality employed in generating the data set, for example on the order of 6 inches.

Camera assembly 300 is illustratively mounted on a rigid table 304 which is suitably insulated from environmental vibrations. In particular, the interference fringe pattern created by the interaction between the object beam and the reference beam is a static wave front which has encoded therein phase and amplitude information about the "object" which is the subject of the hologram. Any relative motion between the object beam, reference beam, and the film within which the hologram is recorded will disrupt this static interference pattern, resulting in significant degradation of the recorded hologram. Thus, it is important that the entire camera assembly be isolated from external vibrations.

To achieve vibration isolation, table 304 suitably comprises a rigid honeycomb top table, e.g., a RS series RS-512-18 product manufactured by Newport of Irvine, Calif. Table 304 is suitably mounted on a plurality (e.g., 4) of pneumatic isolators, e.g., Stabilizer I-2000 also manufactured by Newport.

As an alternative to pneumatically isolating the camera assembly from external vibrations, the various components (including table 304) comprising the camera assembly, may be made from rigid materials and securely mounted to table 304. Such a highly rigid system, while nonetheless vulnerable to a certain degree of externally or internally imposed vibration is likely to move as a single rigid body in response to such vibrations, and can be designed so that it tends to dampen relative motion between the various parts of the system.

To compensate for the low amplitude vibration which inevitably affects the assembly, a technique known as "fringe locking" may be employed. More particularly, the fringe pattern exhibited at the film upon which the hologram is recorded may be magnified and observed by one or more photo diodes (a typical fringe pattern exhibits alternating regions of dark and clear lines). To compensate for any motion of the fringe pattern detected by the photo diode, the pathlength of either the reference beam or the object beam may be manipulated to maintain a stable fringe pattern. For this purpose, a suitable component, for example, one of the mirrors used to direct the object beam or the reference beam, may be mounted on a piezoelectric element configured to move slightly in a predetermined direction in accordance with a voltage signal applied to the piezoelectric element. The output of the photo diode may be applied to a servo-loop which, when applied to the piezoelectric element upon which the mirror is mounted, rapidly corrects the pathlength to compensate for motion of the fringe pattern as sensed by the photo diode. In this way, although small amplitude relative motion between the various components comprising the camera assembly may nonetheless exist, it may be compensated for in the foregoing manner.

Laser source 302 suitably comprises a conventional laser beam generator, for example an Argon ion laser including an etalon element to reduce the bandwidth of the emitted light, preferably an Innova 306-SF manufactured by Coherent, Inc. of Palo Alto, Calif. Those skilled in the art will appreciate that L/laser 302 suitably generates a monochromatic beam having a wavelength in the range of up to 400 to 750 nanometers (nm), and preferably about 514.5 or 532 nm. Those skilled in the art will appreciate, however, that any suitable wavelength may be used for which the selected photographic material is compatible, including wavelengths in the ultraviolet and infrared ranges.

Alternatively, laser 302 may comprise a solid state, diode-pumped frequency-doubled YAG laser, which suitably emits laser light at a wavelength of 532 nm. These lasers are capable of emitting in the range of up to 300 to 600 milliwatts of pure light, are extremely efficient and air-cooled, and exhibit high stability.

Laser 302 should also exhibit a coherence length which is at least as great as the difference between the total path traveled by the reference and object beams, and preferably a coherence length of at least twice this difference. In the illustrated embodiment, nominal design path length traveled by the reference beam is equal to that of the object beam (approximately 292 centimeters); however, due to, inter alia, the geometry of the set-up, the particular reference angle employed, and the size of film, some components of the reference and object beams may travel a slightly greater or lesser path length. Hence, laser 302 exhibits a coherence length in excess of this difference, namely approximately two meters.

Shutter 306 suitably comprises a conventional electromechanical shutter, for example a Uniblitz model no. LCS4Z manufactured by Vincent Associates of Rochester, N.Y. In a preferred embodiment, shutter 306 may be remotely actuated so that a reference beam and an object beam are produced only during exposure of the film substrate, effectively shunting the laser light from the system (e.g., via shutter 306) at all other times. Those skilled in the art will appreciate that the use of a shutter is unnecessary if a pulse laser source is employed. Moreover, it may be desirable to incorporate a plurality of shutters, for example a shutter to selectively control the reference beam and a different shutter to separately control the object beam, to permit independent control of each beam, for example to permit independent measurement and/or calibration of the respective intensities of the reference and object beams at the film surface.

The various mirrors (e.g., first mirror 308, second mirror 312, third mirror 320, etc.) employed in camera assembly 300 suitably comprise conventional front surface mirrors, for example a dielectric mirror coated on a pyrex substrate, for example stock mirror 10D20BD.1, manufactured by Newport. For a typical laser having a beam diameter on the order of 1.5 millimeters, mirror 308 suitably has a surface of approximately 1 inch in diameter.

First mirror 308 is suitably configured to direct a source beam 402 to beam splitting assembly 310. In the illustrated embodiment, first mirror 308 changes the direction of beam 402 by 90 degrees. Those skilled in the art, however, will appreciate that the relative disposition of the various optical components comprising camera assembly 300, and the particular path traveled by the various beams, are in large measure a function of the physical size of the available components. As a working premise, it is desirable that the reference beam and object beam emanate from the same laser source to ensure proper correlation between the reference and the object beam at the surface of film holder 318, and that the path traveled by the reference beam from beam splitter 310 to film 319 is approximately equal to the path traveled by the object beam from beam splitter 310 to film 319.

With momentary reference to FIG. 4, beam splitter assembly 310 preferably comprises a variable wave plate 404, respective fixed wave plates 408 and 412, respective beam splitting cubes 406 and 414, and a mirror 416. On a gross level, beam splitting assembly 310 functions to separate source beam 402 into an object beam 410 and a reference beam 418. Moreover, again with reference to FIG. 3, beam splitter assembly 310 also cooperates with imaging assembly 328 and polarizer 327 to ensure that the reference beam and the object beam are both purely polarized in the same polarization state, i.e., either purely S or purely P polarized as discussed in greater detail below, when they contact an exemplary film substrate 319 mounted in film holder 318. By ensuring that the reference and object beams are pure polarized in the same polarization state, sharp, low noise interference fringe patterns may be formed.

With continued reference to FIG. 4, beam 402 generated by laser source 302 enters beam splitting assembly 310 in a relatively pure polarization state, for example as S polarized light. In the context of the present invention, S polarized light refers to light which is polarized with its electric field oscillating in a vertical plane; P polarized light refers to light having its electric field oriented in a horizontal plane. Beam 402 then passes through variable wave plate 404 whereupon the beam is converted into a beam 403, conveniently defined as comprising a mixture of S and P polarized light components. Beam 403 then enters beam splitting cube 406, which is suitably configured to split beam 403 into a first beam 405 comprising the P polarized light component of beam 403 and a second beam 407 comprising the S polarized light component of beam 403. Beam splitting cube 406 suitably comprises a broad band beam splitter, for example a broad band polarization beam splitter, part no. 05FC16PB.3, manufactured by Newport. Although beam splitting cube 406 is ideally configured to pass all of (and only) the P polarized component of beam 403 and to divert all of (and only) the S polarized component of 403, it has been observed that such cubes are generally imperfect beam splitters, ignoring small losses due to reflection off of beam splitter surfaces. More precisely, such cubes typically exhibit an extinction ratio on the order of a thousand to one such that approximately 99.9 percent of the S polarized component of beam 403 is diverted into beam 407, and such that approximately 90 percent of the P polarized component of beam 403 passes through cube 406. Thus, beam 407 comprises 99.9 percent of the S polarized component of beam 403, and approximately 10 percent of the P polarized component of beam 403; similarly, beam 405 comprises approximately 90 percent of the P polarized component of beam 403 and approximately 0.1 percent of the S polarized component of beam 403.

Wave plates 404, 408, and 412 suitably comprise half wave plates for the laser wavelength in use, e.g., part no. 05RP02 available from Newport. Wave plate 404 is configured to convert the S polarized beam 402 into a predetermined ratio of S and P polarized components. In a preferred embodiment, variable wave plate 404 comprises an LCD layer, which layer changes the polarization of the incoming beam in accordance with the voltage level at the LCD layer. A suitable wave plate 404 may comprise a Liquid-Crystal Light Control System, 932-VIS manufactured by Newport. Accordingly, wave plate 404 divides S polarized beam 402 into a mixture of S and P polarized light as a function of applied voltage. By manipulating the voltage on wave plate 404, the operator thereby controls the ratio of the intensity of the reference beam to the intensity of the object beam (the beam ratio). In a preferred embodiment, this ratio as measured at the plane of film 319 is approximately equal to unity.

In any event, beam 405 is almost completely pure P polarized, regardless of the voltage applied to wave plate 404; beam 407 is ideally pure S polarized, but may nonetheless contain a substantial P polarized component, depending on the voltage applied to wave plate 404.

With continued reference to FIG. 4, beam 405 then travels through wave plate 408 to convert the pure P polarized beam 405 to a pure S polarized object beam 410. Beam 407 is passed through wave plate 412 to convert the substantially S polarized beam to a substantially P polarized beam 409 which thereafter passes through splitting cube 414 to eliminate any extraneous S component. In particular, 99.9 percent of the residual S component of beam 409 is diverted from cube 414 as beam 415 and shunted from the system. In the context of the present invention, any beam which is shunted from or otherwise removed from the system may be conveniently employed to monitor the intensity and quality of the beam.

The predominantly P component of beam 409 is passed through cube 414 and reflected by respective mirrors 416 and 312, resulting in a substantially pure P polarized reference beam 418. As discussed in greater detail below, by dividing source beam 402 into object beam 410 and reference beam 418 in the foregoing manner, both the object beam and reference beam exhibit extremely pure polarization, for example on the order of one part impurity in several thousand. Moreover, a high degree of polarization purity is obtained regardless of the beam ratio, which is conveniently and precisely controlled by controlling the voltage applied to variable wave plate 404.

With continued reference to FIGS. 3 and 4, beam 418 is reflected off mirror 312 and enters beam expander 314. Beam expander 314 preferably comprises a conventional positive lens 421 and a tiny aperture 420. The diameter of beam 418 at the time it enters beam expander 314 is suitably on the order of approximately 1.5 millimeters (essentially the same diameter as when it was discharged from laser 302). Positive lens 421 is configured to bring beam 418 to as small a focus as practicable. A suitable positive lens may comprise microscope objective M-20X manufactured by Newport. Aperture 420 suitably comprises a pin-hole aperture, for example a PH-15 aperture manufactured by Newport. For good quality lasers which emit pure light in the fundamental transverse electromagnetic mode ($TEM_{00}$), a good quality lens, such as lens 421, can typically focus beam 418 down to the order of approximately 10 to 15 microns in diameter. At the point of focus, the beam is then passed through aperture 420, which suitably comprises a small pin hole on the order of 15 microns in diameter. Focusing the beam in this manner effects a Fourier transform of the beam.

More particularly and with reference to FIGS. 5A–5D, the TEM$_{00}$ mode of propagation typically exhibited by a small diameter laser beam follows a Gaussian distribution transverse to the direction of propagation of the beam. With specific reference to FIG. 5A, this means that the intensity (I) of beam 418 exhibits a Gaussian distribution over a cross-section of the beam. For a Gaussian beam having a nominal diameter of one millimeter, a small amount of the beam at very low intensity extends beyond the 1 millimeter range.

Figure 5A:
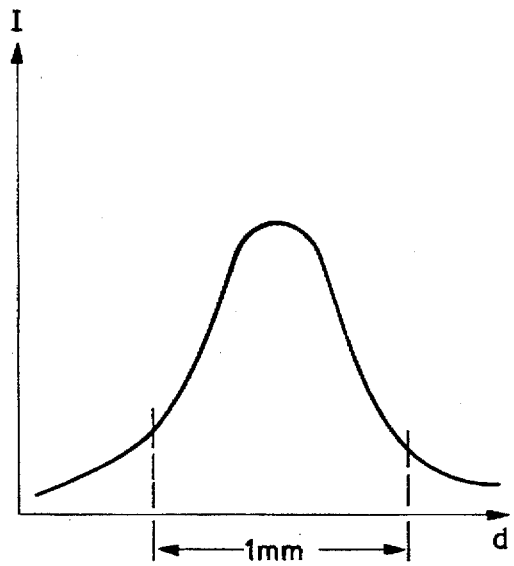
Figure 5B:
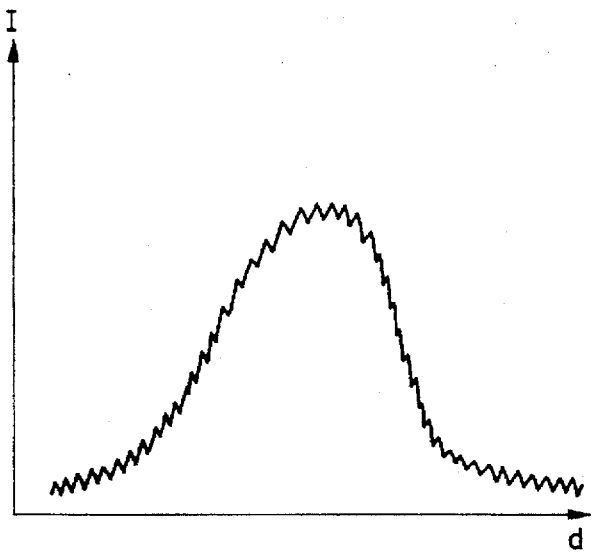

With reference to FIG. 5B, a more accurate representation of the ideal condition shown in FIG. 5A illustrates a substantially Gaussian distribution, but also including the random high frequency noise inevitably imparted to a beam as it is bounced off mirrors, polarized, etc. Note that FIG. 5B exhibits the same basic Gaussian profile of the theoretical Gaussian distribution of FIG. 5A, but further including random high frequency noise in the form of ripples.

Figure 5C:
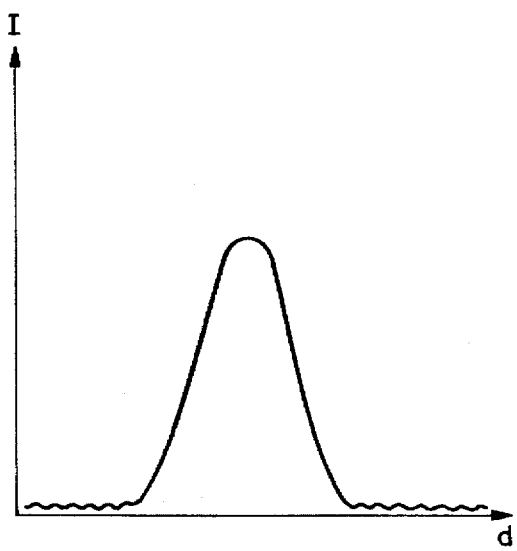
Figure 5D:
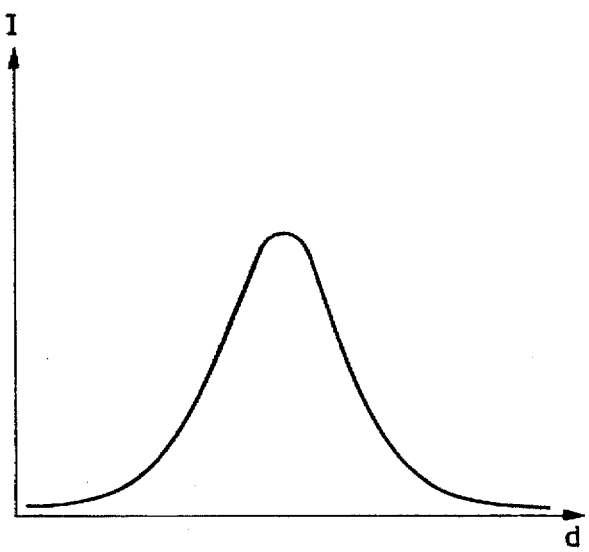

It is known that the Fourier transform of a Gaussian with noise produces the same basic Gaussian profile, but with the high frequency noise components shifted out onto the wings, as shown in FIG. 5C. When the Fourier transform of the beam is passed through an aperture, such as aperture 420 of beam expander 314, the high frequency wings are clipped, resulting in the extremely clean, noise free Gaussian distribution of FIG. 5D. Quite literally, focusing the beam to approximate a point source, and thereafter passing it through an aperture has the effect of shifting the high frequency noise to the outer bounds of the beam and clipping the noise.

Beam expander 314 thus produces a substantially noise free, Gaussian distributed divergent reference beam 423.

In a preferred embodiment of the present invention, lens 421 and aperture 420 suitably comprise a single, integral optical component, for example a Spatial Filter 900 Model manufactured by Newport. Beam expander assembly 314 advantageously includes a screw thread, such that the distance between lens 421 and aperture 420 may be precisely controlled, for example on the order of about 5 millimeters, and two orthogonal set screws to control the horizontal and vertical positions of the aperture relative to the focus of lens 421.

With continued reference to FIG. 3, mirror 312 is suitably configured to direct beam 423 at film 319 at a predetermined angle which closely approximates Brewster's angle for the material comprising film 319. Those skilled in the art will appreciate that Brewster's angle is often defined as the arc tangent of the refractive index of the material upon which the beam is incident (here, film 319). Typical refractive indices for such films are in the range of approximately 1.5±0.1. Thus, in accordance with a preferred embodiment of the invention, mirror 312 is configured such that beam 423 strikes film 319 at a Brewster's angle of approximately 56 degrees (arc tan 1.5≈56 degrees). Those skilled in the art will also appreciate that a P polarized beam incident upon a surface at Brewster's angle will exhibit minimum reflection from that surface, resulting in maximum refraction of reference beam 423 into film 319, thereby facilitating maximum interference with the object beam and minimum back-reflected light which could otherwise eventually find its way into the film from an incorrect direction.

Referring now to FIGS. 4 and 6–7, object beam 410 is reflected by mirror 320 and directed into beam expander 322 which is similar in structure and function to beam expander 314 described above in conjunction with FIG. 4. A substantially noise free, Gaussian distributed divergent object beam 411 emerges from beam expander 322 and is collimated by a collimating lens 434, resulting in a collimated object beam 436 having a diameter in the range of approximately 5 centimeters. Collimating lens 434 suitably comprises a bi-convex optical glass lens KBX148 manufactured by Newport. Collimated object beam 436 is applied to imaging assembly 328.

With reference to FIGS. 7 and 8, imaging assembly 328 suitably comprises a cathode ray tube (CRT) 444, a light valve 442, a wave plate 463, and a polarizing beam splitting cube 438. In a preferred embodiment, beam splitting cube 438 is approximately a 5 centimeter square (2 inch square) cube. As discussed in greater detail below, a beam 460, comprising a P polarized beam which incorporates the data from a data slice through the action of imaging assembly 328, emerges from projection assembly 328 and is applied to imaging optics assembly 324.

As discussed above, a data set comprising a plurality of two-dimensional images corresponding to the three-dimensional subject of the hologram is prepared for use in producing the master hologram. The data set may also be maintained in an electronic data file in a conventional multi-purpose computer (not shown) The computer interfaces with CRT 444 such that the data slices are transmitted, one after the other, within imaging assembly 328.

More particularly, a first data slice is projected by CRT 444 onto light valve 442. As explained in greater detail below, the image corresponding to the data slice is applied onto film 319. The reference and object beams are applied to film 319 for a predetermined amount of time sufficient to permit film 319 to capture (record) a fringe pattern associated with that data slice and thereby create a hologram of the data slice within the emulsion comprising film 319. Thereafter, track assembly 334 is moved axially and a subsequent data slice is projected onto film 319 in accordance with the distances between data slices; a subsequent hologram corresponding to the subsequent data slice is thus superimposed onto film 319. This process is sequentially repeated for each data slice until the number of holograms superimposed onto film 319 corresponds to the number of data slices 14 comprising the particular volumetric data set 16 which is the subject matter of the master hologram being produced.

More particularly and with continued reference to FIGS. 7 and 8, CRT 444 suitably comprises a conventional fiber-optic face-plate CRT, for example, H1397T1 manufactured by the Hughes Aircraft Company of Carlsbad, Calif. CRT 444 is configured to project an image corresponding to a particular data slice onto the left hand side of light valve 442 (FIG. 7).

In a preferred embodiment, light valve 442 is a Liquid Crystal Light Valve H4160 manufactured by Hughes Aircraft Company of Carlsbad, Calif. With specific reference to FIG. 8, light valve 442 preferably comprises a photocathode 454, a mirror 450, having its mirrored surface facing to the right in FIG. 8, and a liquid crystal layer 452. Liquid crystal layer 452 comprises a thin, planar volume of liquid crystal which alters the polarization of the light passing therethrough as a function of the localized voltage level of the liquid crystal.

Photocathode 454 comprises a thin, planar volume of a photovoltaic material which exhibits localized voltage levels as a function of light incident thereon. As the image corresponding to a particular data slice 14 is applied by CRT 444 onto photocathode 454, local photovoltaic potentials are formed on the surface of photocathode 454 in direct correspondence to the light distribution within the cross-section of the applied image beam. In particular, the beam generated by CRT 444 corresponding to the data slice typically comprises light regions corresponding to bone, soft tissue, and the like, on a dark background. The dark background areas predictably exhibit relatively low grey scale values, whereas the lighter regions of the data slice exhibit correspondingly higher grey scale values. A charge distribution corresponding to the projected image is produced on the surface of photocathode 454.

The static, non-uniform charge distribution on photocathode 454, corresponding to local brightness variations in the data embodied in a particular data slice 14, passes through mirror 450 and produces corresponding localized voltage levels across the surface of liquid crystal layer 452. These localized voltage levels within liquid crystal layer 452 rotate the local liquid crystal in proportion to the local voltage level, thereby altering the pure S polarized light diverted from cube 438 onto mirrored surface 450, into localized regions of polarized light having a P component associated therewith, as the light passes through crystal layer 452 and is reflected by mirror 450. The emerging beam 460 exhibits (in cross-section) a distribution of P polarized light in accordance with the voltage distribution within crystal layer 452 and, hence, in accordance with the image corresponding to the then current data slice 14.

Substantially all (e.g., 99.9%) of the S polarized light comprising beam 436 is diverted by cube 438 onto liquid crystal layer 452. This S polarized light is converted to P polarized light by liquid crystal layer 452 in accordance with the voltage distribution on its surface, as described above. The P polarized light is reflected by the mirrored surface of mirror 450 back into cube 438; the P polarized light passes readily through cube 438 into projection optics assembly 324.

The S component of the beam reflected off of the mirrored surface of mirror 450 will be diverted 90 degrees by beam splitting cube 438. To prevent this stray S polarized light from re-entering the system, cube 438 may be tilted slightly so that this S polarized light is effectively shunted from the system.

The resultant beam 460 exhibits a distribution of P polarized light across its cross-section which directly corresponds to the data embodied in the data slice currently projected by CRT 444 onto light valve 442. As a result of the high extinction ratio of cube 438, beam 460 comprises essentially zero S polarization. Note also that the small portion of S polarized light comprising beam 436 which is not reflected by cube 438 into light valve 442 (namely, a beam 440) may be conveniently shunted from the system.

Beam splitting cube 438 is similar in structure and function to beam splitting cubes 406 and 414, described herein in connection with FIG. 4, and preferably comprises a large broad band polarization beam splitter, for example a PBS-514.5-200 manufactured by CVI Laser Corporate of Albuquerque, N.Mex. In a preferred embodiment, beam splitting cube 438 has a cross-section at least as large as the image projected by CRT 444 onto light valve 442, e.g., 2 inches. This is in contrast to beam splitting cubes 406 and 414 which can advantageously be of smaller cross-section, e.g., one-half inch, comparable to the diameter of the unexpanded beam 402 from laser 302.

In the context of the present invention, light which is variously described as removed, eliminated, or shunted from the system may be disposed of in any number of convenient ways. For example, the light may be directed into a black box or onto a black, preferably textured surface. The precise manner in which the light is shunted, or the particular location to which the light is shunted is largely a matter of convenience; what is important is that light is to be removed from the system be prevented from striking the film surface of a hologram (for reasons discussed herein), and further that the light be prevented from reentering the laser source which could disturb or even damage the laser.

Although projection optics 328 illustratively comprises light valve 442, any suitable mechanism which effectively integrates the image corresponding to a data slice into the object beam will work equally well in the context of the present invention. Indeed, light beam 460, after emerging from cube 438, merely comprises a nonuniform distribution of P polarized light which varies in intensity according to the distribution of data on the then current data slice 14. The cross-section of beam 460 is substantially identical to a hypothetical beam of P polarized light passed through a photographic slide of the instant data slice.

With continued reference to FIGS. 7 and 8, wave plate 463 is suitably interposed between light valve 442 and beam splitting cube 438. Wave plate 463 functions to correct certain undesirable polarization which light valve 442 inherently produces.

More particularly, light valve 442 polarizes the light which passes through liquid crystal layer 452 in accordance with the local voltage distribution therewithin. Specifically, the applied voltage causes the liquid crystals to rotate, e.g., in an elliptical manner, the amount of rotation being proportional to the localized voltage level. That is, a very high voltage produces a large amount of liquid crystal rotation, resulting in a high degree of alteration of the polarization of the light passing through the rotated crystals. On the other hand, a very low voltage produces a correspondingly small degree of liquid crystal rotation, resulting in a correspondingly small amount of alteration in the level of the polarization. However, it has been observed that a very small degree of liquid crystal rotation (pre-tilt) exists even in the absence of an applied voltage. Thus, approximately one percent of the S polarized light passing through liquid crystal layer 452 is converted to P polarized light, even within local regions of liquid crystal layer 452 where no voltage is applied. While this very small degree of spurious polarization does not generally degrade the performance of light valve 442 in most contexts, it can be problematic in the context of the present invention. For example, if one percent of pure S polarized light is inadvertently converted to P polarized light, the contrast ratio of the resulting hologram may be substantially limited.

Wave plate 463 is configured to compensate for the foregoing residual polarization by, for example, imparting a predetermined polarization to the light passing therethrough, which is calculated to exactly cancel that amount of polarization induced by liquid crystal layer 452 in the absence of an applied voltage. By eliminating this undesired polarization, the effective contrast ratio of the resulting hologram is limited only by the degree of control achieved in the various process parameters, as well as the inherent capabilities of the equipment comprising camera assembly 300.

With reference to FIGS. 6 and 7, projection optics assembly 324 suitably comprises a projection lens 462, a mirror 464, and an aperture 466. Lens 462 preferably comprises a telecentric projection lens optimized for specific image sizes used on light valve 442 and rear projection screen 326. Lens 462 converges collimated beam 460 until the converging beam, after striking mirror 464, converges to a focal point, whereupon it thereafter forms a divergent beam 470 which effectively images the data corresponding to the then current data slice 14 onto projection screen 326 and onto film 319. Beam 470 passes through an aperture 466 at approximately the point where beam 470 reaches a focal point. Aperture 466 preferably comprises an iris diaphragm ID-0.5 manufactured by Newport. Note, however, that aperture 466 is substantially larger than the diameter of beam 470 at the point where the beam passes through aperture 466. This is in contrast to the pinhole apertures comprising beam expanders 314 and 322 which function to remove the high frequency components from the beam. The high frequency components within beams 460 and 470 are important in the present invention inasmuch as they may correspond to the data which is the subject of the hologram being produced. Aperture 466 simply traps and shunts scattered light and otherwise misdirected light carried by beam 470 or otherwise visible to projection screen 326 and which is not related to the information corresponding to the data on data slice 14.

With reference to FIGS. 3, 4 and 6, beam 470 is projected to apply a focused image onto rear projection screen 326. Screen 326 is suitably on the order of 14 inches in width by 17 inches in height, and preferably comprises a thin, planar diffusing material adhered to one surface of a rigid, transparent substrate, for example a 0.5 inch thick glass sheet 472. Diffuser 472 is fabricated from a diffusing material, e.g., Lumiglas-130 manufactured by Stewart Filmscreen Corporation of Torrance, Calif. Screen 472 diffuses beam 470 such that each point within beam 470 is visible over the entire surface area of film 319. For example, an exemplary point Y on beam 470 is diffused by diffuser 472 so that the object beam at point Y manifests a conical spread, indicated by cone Y', onto film 319. Similarly, an arbitrary point X on screen 472 casts a diffuse conical projection X' onto film 319. This phenomenon holds true for every point within the projected image as the image passes through diffuser 472. As a result, every point on film 319 embodies a fringe pattern which encodes the amplitude and phase information for every point on diffuser 472.

Since light from every point on diffuser 472 is diffused onto the entire surface of film 319, it follows that every point on film 319 "sees" each and every point within the projected image as the projected image appears on diffuser 472. However, each point on film 319 necessarily sees the entire image, as the image appears on diffuser 472, from a slightly different perspective. For example, an arbitrary point Z on film 319 "sees" every point on diffuser 472. Moreover, an arbitrary point W on film 319 also "sees" every point on screen 472, yet from a very different perspective than point Z. Thus, after emerging from diffuser 472 and polarizer 327, the diffuse image carried by object beam 473 is applied onto film 319.

Polarizer 327 is advantageously mounted on the surface of diffusing diffuser 472. Although the light (beam 470) incident on diffusing diffuser 472 is substantially P polarized, diffuser 472, by its very nature, scatters the light passing therethrough, typically depolarizing some of the light. Polarizer 327, for example a thin, planer, polarizing sheet, repolarizes the light so that it is in a substantially pure P polarization state when it reaches film 319. Note that polarizer 327 is disposed after diffuser 472, so that the light improperly polarized by diffuser 472 is absorbed. This ensures that a high percentage of the object beam, being substantially purely P polarized, will interfere with the reference beam at film 319, further enhancing the contrast of each hologram.

The manner in which the complex object wave front traveling from diffuser 472 to film 319 is encoded within the film, namely in the form of a static interference pattern, is the essence of holographic reproduction. Those skilled in the art will appreciate that the interference (fringe) pattern encoded within the film is the result of constructive and destructive interaction between the object beam and the reference beam. That being the case, it is important that the object beam and reference beam comprise light of the same wavelength. Although two light beams of different wavelengths may interact, the interaction will not be constant within a particular plane or thin volume (e.g., the "plane" of the recording film). Rather, the interaction will be a time-varying function of the two wavelengths.

The static (time invariant) interaction between the object and reference beams in accordance with the present invention results from the monochromatic nature of the source of the reference and object beams (i.e. monochromatic laser source 302 exhibiting an adequate coherence length). Moreover, those skilled in the art will further appreciate that maximum interaction occurs between light beams in the same polarization state. Accordingly, maximum interaction between the object and reference beams may be achieved by ensuring that each beam is purely polarized in the same polarization state at the surface of film 319. For the configuration set forth in FIG. 6, the present inventor has determined that P polarized light produces superior fringe patterns. Thus, to enhance the interference between object beam 470 and reference beam 423, beam 470 passes through polarizing screen 327 adhered to the surface of diffuser 472.

The pure P polarized reference beam 423 passes through a collimating lens 316 and is collimated before striking film 319. Inasmuch as the reference and object beams both emanate from the same laser 302, and further in view of the relatively long coherence length of laser 302 relative to the differential path traveled by the beams from the laser to film 319, the reference and object beams incident on film 319 are mutually coherent, monochromatic (e.g., 514.5 nm highly purely P polarized) and, hence, highly correlated. In addition, reference beam 423 is highly ordered, being essentially noise free and collimized. Object beam 470, on the other hand, is a complicated wave front which incorporates the data from the current data slice. These two waves interact extensively within the volume of the emulsion comprising film 319, producing a static, standing wave pattern. The standing wave pattern exhibits a high degree of both constructive and destructive interference. In particular, the energy level E at any particular point within the volume of the emulsion may be described as follows:

$$E = [A_o \cos \beta_o + A_r \cos \beta_r]^2$$

where $A_o$ and $A_r$ represent the peak amplitude of the object and reference beams, respectively, at a particular point, and $\beta_o$ and $\beta_r$ represent the phase of the object and reference beams at that same point. Note that since the cosine of the phase is just as likely to be positive as negative at any given point, the energy value E at any given point will range from 0 to $4A^2$ ($A_o = A_r$ for a unity beam ratio). This constructive and destructive wave interference produces well defined fringe patterns.

With momentary reference to FIG. 12, the relative orientation of the reference beam, object beam, and replay beam is illustrated in the context of a transmission hologram (FIGS. 12A and 12B) and a reflection hologram (FIGS. 12C and 12D), without regard to the effects of refraction as the light enters and exits the material.

Figure 12A:
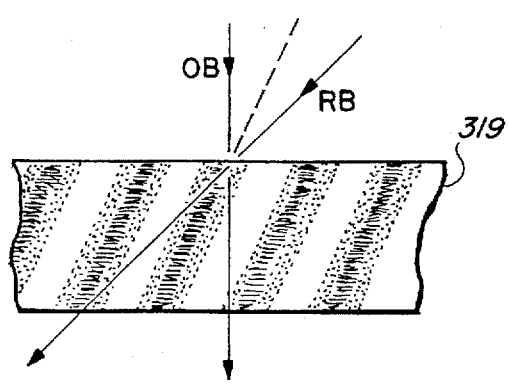
Figure 12B:
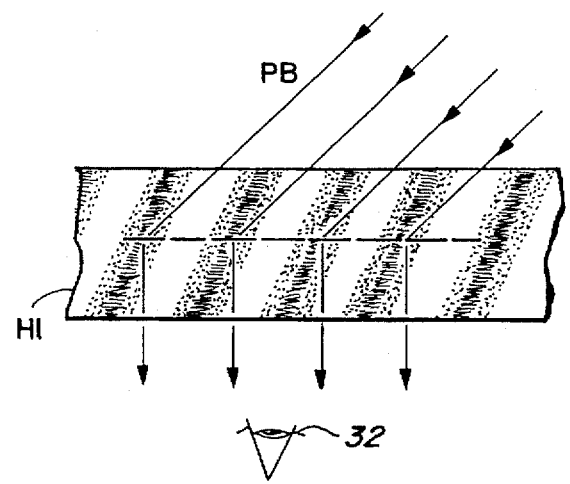

The emulsion within which a fringe pattern is recorded is typically on the order of about six microns in thickness. With particular reference to FIG. 12A, alternating black and white lines of a fringe pattern typically span the emulsion much like the slats of a venetian blind, parallel to a line bisecting the angle between the reference beam (RB) and object beam (OB). When the transmission hologram shown in FIGS. 12A and 12B is replayed with a replay beam (PB), the fringe planes act like partial mirrors, observer 32 thus views a transmission hologram from the opposite side from which the replay beam is directed.

Figure 12C:
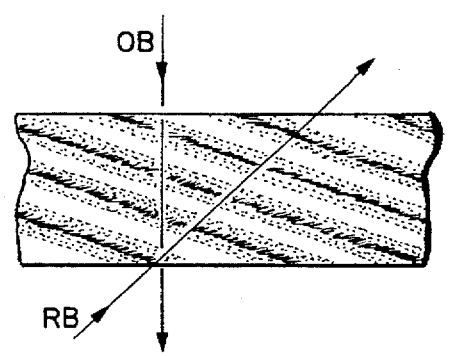
Figure 12D:
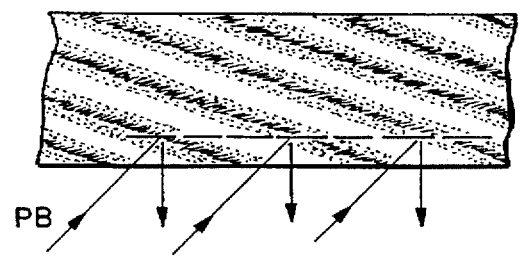

In a reflection hologram, on the other hand, the fringe lines are substantially parallel to the plane of the film (FIGS. 12C and 12D). Those skilled in the art will appreciate that reflection holograms are typically produced by directing the reference beam and the object beams from opposite sides of the film. When a reflection hologram is replayed, the replay beam (PB) is directed from the same side from which the reference beam (RB) was directed, resulting in a reflection of the replay beam (PB) along the direction of the original object beam (OB). While many aspects of the present invention may be employed in the context of a reflection hologram, the apparatus and methods described herein are best suited for use in conjunction with transmission holograms. Moreover, it can be appreciated that transmission holograms are less sensitive to vibration during manufacture, inasmuch as the films are typically mounted in a vertical plane, and a high percentage of spurious environmental vibrations comprise a large horizontal component.

With continued reference to FIG. 12A, the object beam (OB) and reference beam (RB) form a record of a microscopic fringe pattern within the emulsion in the form of alternating dark and clear lines. The dark regions generally correspond to relatively high localized energy levels sufficient to convert silver halide crystals and thus create a record of the interference pattern.

For each data slice, film 319 will be exposed to the standing wave pattern for a predetermined exposure time sufficient to convert that data slice's pro data share of silver halide grains.

After film 319 is exposed to the interference pattern corresponding to a particular data slice, track assembly 334 is moved forward (or, alternatively, backward) by a predetermined amount proportional to the distance between the data slices. For example, if a life size hologram is being produced from CT data, this distance suitably corresponds exactly to the distance traveled by the subject (e.g., the patient) at the time the data slices were generated. If a less than or greater than life size hologram is being produced, these distances are varied accordingly.

In accordance with a preferred embodiment of the invention, film 319 suitably comprises HOLOTEST (TM) holographic film, for Film No. 8E 56HD, manufactured by AGFA, Inc. The film suitably comprises a gelatinous emulsion prepared on the surface of a plastic substrate. An exemplary film may have a thickness on the order of 0.007 inches, with an emulsion layer typically on the order of approximately 6 microns.

During the early 1980s, commercial holographic films were primarily made using a plastic substrate comprising polyester, principally because of its superior mechanical properties (tear resistance, curl resistance, resistance to fading, etc.) However, typical polyesters exhibit a degree of birefringence, i.e. the P components of the incident beam travel through the material at a different rate (and hence a different direction) than the S components. For holograms recorded or using an unpolarized source, e.g., a white light source, various components within the white light travel through the material in different directions, resulting in compromised fidelity of the replayed hologram. As a result, the industry now generally employs a non-birefringent triacetate substrate because of its minimal affect on the polarization of incident light.

In accordance with one aspect of the present invention, both the reference beam and object beam incident on the holographic film, whether during production of the master hologram or during production of the copy hologram, is substantially pure polarized. That being the case, the birefringent property of polyester does not adversely affect the subject holograms. Moreover, in transmission holography, the reference and object beams may be configured to interact at the emulsion before either beam reaches the substrate; hence, birefringence is less of a problem for this reason also. Accordingly, holographic films used in the context of the present invention typically comprise a polyester backing, thereby exploiting the superior mechanical properties of the film without the drawbacks associated with prior art systems.

In contrast to conventional photography, wherein amplitude information pertaining to the incident light is recorded within the film emulsion, a hologram contains a record of both amplitude and phase information. When the hologram is replayed using the same wavelength of light used to create the hologram, the light emanating from the film continues to propagate just as it did when it was "frozen" within the film, with its phase and amplitude information substantially intact. The mechanism by which the amplitude and phase information is recorded, however, is not widely understood.

As discussed above, the reference beam and object beam, in accordance with the present invention, are of the same wavelength and polarization state at the surface of film 319. The interaction between these two wave fronts creates a standing (static) wave front, which extends through the thickness of the emulsion. At points within the emulsion where the object and reference beam constructively interact, a higher energy level is present than would be present for either beam independently. At points within the emulsion where the reference and object beam destructively interact, an energy level exists which is less than the energy level exhibited by at least one of the beams. Moreover, the instantaneous amplitude of each beam at the point of interaction is defined by the product of the peak amplitude of the beam and the cosine of its phase at that point. Thus, while holographers speak of recording the amplitude and phase information of a wave, in practical effect the phase information is "recorded" by virtue of the fact that the instantaneous amplitude of a wave at a particular point is a function of the phase at that point. By recording the instantaneous amplitude and phase of the static interference pattern between the reference and object beams within the three-dimensional emulsion, a "three-dimensional picture" of the object as viewed from the plane of film 319 is recorded. Since this record contains amplitude and phase information, a three-dimensional image is recreated when the hologram is replayed.

After every data slice comprising a data set is recorded onto film 319 in the foregoing manner, film 319 is removed from film holder 318 for processing.

As discussed above, the photographic emulsion employed in the present invention comprises a large number of silver halide crystals suspended in a gelatinous emulsion. While any suitable photosensitive element may be employed in this context, silver halide crystals are generally on the order of 1,000 times more sensitive to light than other known photosensitive elements. The resulting short exposure time for silver halide renders it extremely compatible with holographic applications, wherein spurious vibrations can severely erode the quality of the holograms. By keeping exposure times short in duration for a given laser power, the effects of vibration may be minimized.

As also discussed above, a hologram corresponding to each of a plurality of data slices is sequentially encoded onto film 319. After every slice comprising a particular data set has been recorded onto the film, the film is removed from camera assembly 300 for processing. Before discussing the particular processing steps in detail, it is helpful to understand the photographic function of silver halide crystals.

In conventional photography, just as in amplitude holography, a silver halide crystal which is exposed to a threshold energy level for a threshold exposure time becomes a latent silver halide grain. Upon subsequent immersion in a developer, the latent silver halide grains are converted to silver crystals. In this regard, it is important to note that a particular silver halide grain carries only binary data; that is, it is either converted to a silver crystal or it remains a silver halide grain throughout the process. Depending on the processing techniques employed, a silver halide grain may ultimately correspond to a dark region and a silver crystal to a light region, or vice versa. In any event, a particular silver halide grain is either converted to silver or left intact and, hence, it is either "on" (logic hi) or "off" (logic low) in the finished product.

In conventional photography as well as in amplitude holography, the exposed film is immersed in a developing solution (the developer) which converts the latent silver halide grains into silver crystals, but which has a negligible affect on the unexposed silver halide grains. The developed film is then immersed in a fixer which removes the unexposed silver halide grains, leaving clear emulsion in the unexposed regions of the film, and silver crystals in the emulsion in the exposed areas of the film. Those skilled in the art will appreciate that the converted silver crystals, however, have a black appearance and, hence, tend to absorb or scatter light, decreasing the efficiency of the resulting hologram.

In phase holography, on the other hand, the exposed film is bleached to remove the opaque converted silver, leaving the unexposed silver halide grains intact. Thus, after bleaching, the film comprises regions of pure gelatinous emulsion comprising neither silver nor silver halide (corresponding to the exposed regions), and a gelatinous emulsion comprising silver halide (corresponding to the unexposed regions). Phase holography is predicated on inter alia, the fact that the gelatin containing silver has a very different refractive index than the pure gelatin and, hence, will diffract light passing therethrough in a correspondingly different manner.

The resulting bleached film thus exhibits fringe patterns comprising alternating lines of high and low refractive indices. However, neither material comprises opaque silver crystals, so that a substantially insignificant amount of the light used to replay the hologram is absorbed by the hologram, as opposed to amplitude holographic techniques wherein the opaque silver crystals absorb or scatter a substantial amount of the light.

More particularly, the present invention contemplates a six-stage processing scheme, for example, performed on a Hope RA2016V photoprocessor manufactured by Hope Industries of Willow Grove, Pa.

In stage 1, the film is developed in an aqueous developer to convert the latent silver halide grains to silver crystals, which may be made by mixing, in an aqueous solution (e.g., 1800 ml) of distilled water, ascorbic acid (e.g., 30.0 g), sodium carbonate (e.g., 40.0 g), sodium hydroxide (e.g., 12.0 g), sodium bromide (e.g., 1.9 g), phenidone (e.g., 0.6 g), and thereafter adding distilled water resulting a 2 liter developing solution.

In stage 2, the film is washed to halt the development process of stage 1.

Stage 3 involves immersing the film in an 8 liter bleach solution comprising distilled water (e.g., 7200.0 ml), sodium dichromate (e.g., 19.0 g), and sulfuric acid (e.g., 24.0 ml). Stage 3 removes the developed silver crystals from the emulsion.

Stage 4 involves washing the film to remove the stage 3 bleach.

Stage 5 involves immersing the film in a 1 liter stabilizing solution comprising distilled water (e.g., 50.0 ml), potassium iodide (e.g., 2.5 g), and Kodak PHOTO-FLO (e.g., 5.0 ml) The stabilizing stage desensitizes the remaining silver halide grains to enhance long-term stability against subsequent exposure.

In stage 6, the film is dried in a conventional hot-air drying stage. Stage 6 is suitably performed in the range of 100 degrees fahrenheit; stages 1 and 3 are performed at 86 degrees fahrenheit; and the remaining stages may be performed at ambient temperature.

With momentary reference to FIGS. 12A and 12B, the alternating high and low refractive index lines of the phase holograms, produced in accordance with the present invention, are illustrated as black and white regions. When the replay beam (PB) illuminates the hologram, the higher density regions diffract the incoming light differently than the low density regions, resulting in a bright, diffuse image, as viewed by observer 32. Although FIG. 12B schematically illustrates the replay mechanism as a reflection phenomenon, the present inventor has determined that the precise replay mechanism is actually a phenomenon rooted in wave mechanics, such that the light actually "bends" around the various fringe surfaces, rather than literally being reflected off the fringes.

Upon completion of the processing of film 319, the resulting master hologram may be used to create one or more copies.

In accordance with one aspect of the invention, it may be desirable to produce a copy of the master hologram and to replay the copy when observing the hologram, rather than to replay and observe the master hologram directly. With reference to FIG. 10, FIG. 10A depicts a collimated replay beam PB replaying a master hologram, with beam PB being directed at the film from the same direction as the collimated reference beam used to create the hologram (H1). This is referred to as orthoscopic reconstruction. This is consistent with the layout in FIG. 3, wherein the data slices, corresponding to respective images 1002 in FIG. 10, were also illuminated onto the film from the same side of the film as the reference beam. However, when observed by an observer 1004, the reconstructed images appear to be on the opposite side of the film from the observer. Although the reconstructed images 1002 are not literally behind hologram H1, they appear to be so just in the same way an object viewed when facing a mirror appears to be behind the mirror.

With momentary reference to FIG. 10B, hologram H1 is inverted and again replayed with the replay beam PB. In this configuration, known as pseudoscopic reconstruction, the images 1002 appear to the observer as being between the observer and the film being replayed. When master hologram H1 is copied using copy assembly 900, the pseudoscopic reconstruction set forth in FIG. 10B is essentially reconstructed, wherein the master hologram is shown as H1, and a holographic film corresponding to the copy hologram is positioned within the images 1002 in a plane P. The assembly shown in FIG. 10B illustrates the copy film (plane P) as being centered within the images 1002, thereby yielding a copy hologram which, when replayed, would appear to have half of the three-dimensional image projecting forward from the film and half the three-dimensional image projected back behind the film. However, in accordance with an alternate embodiment of the present invention, the copy assembly may be configured such that plane P assumes any desired position with respect to the data set, such that any corresponding portion of the three-dimensional image may extend out from or into the plane in which the copy film is mounted.

COPY ASSEMBLY.

Referring now to FIG. 9, copy assembly 900 is suitably mounted to a table 904 in much the same way camera assembly 3 is mounted to table 304 as described in conjunction with FIG. 3. Copy assembly 900 suitably comprises a laser source 824, respective mirrors 810, 812, 820, and 850, a beam splitting cube 818, a wave plate 816, respective beam expanders 813 and 821, respective collimating lenses 830 and 832, a master film holder 834 having respective legs 836A and 836B, and a copy film holder 838 having a front surface 840 configured to securely hold copy film substrate H2 in place.

Film holder 838 and, if desired, respective film holders 834 and 318 are suitably equipped with vacuum equipment, for example, vacuum line 842, for drawing a vacuum between the film and the film holder to thereby securely hold the film in place. By ensuring intimate contact between the film and the holder, the effects of vibration and other spurious film movements which can adversely impact the interference fringe patterns recorded therein may be substantially reduced.

Film holders 838 and 318 desirably comprise an opaque, non-reflective (e.g., black) surface to minimize unwanted reflected light therefrom. Film holder 834, on the other hand, necessarily comprises a transparent surface inasmuch as the object beam must pass therethrough on its way to film holder 838. Accordingly, the opaque film holders, may, if desired, comprise a vacuum surface so that the film held thereby is securely vacuum-secured across the entire vacuum surface. Film holder 834, on the other hand, being transparent, suitably comprises a perimeter channel wherein the corresponding perimeter of the film held thereby is retained in the holder by a perimeter vacuum channel. A glass or other transparent surface may be conveniently disposed within the perimeter of the channel, and a roller employed to remove any air which may be trapped between the film and the glass surface.

Although a preferred embodiment of the present invention employs the foregoing vacuum film holding techniques, any mechanism for securely holding the film may be conveniently used in the context of the present invention, including the use of an electrostatic film holder; a pair of opposing glass plates wherein the film is tightly sandwiched therebetween; the use of a suitable mechanism for gripping the perimeter of the film and maintaining surface tension thereacross; or the use of an air tight cell, wherein compressed air may be maintained within the cell to securely hold the film against one surface of the air tight chamber, the chamber further including a bleed hole disposed on the surface of the cell against which the film is held from which the compressed air may escape.

With continued reference to FIG. 9, laser source 824 is suitably similar to laser 302, and suitably produces laser light of the same wavelength as that used to create the master hologram (e.g., 514.5 nm). Alternatively, a laser source for producing the copy may employ a different, yet predetermined, wavelength of light, provided the angle that the reference beam illuminates film H1 is varied in accordance with such wavelength. Those skilled in the art will appreciate that the wavelength of the reference beam ($\lambda$) illuminating hologram H1 is advantageously proportional to the sine of its incident angle, i.e. $\lambda = K \sin \theta$. Moreover, by manipulating the processing parameters to either shrink or swell the emulsion, the relationship between the wavelength and the incident angle can be further adjusted in accordance with the relationship $\lambda = K \sin \theta$.

A source beam 825 from laser 824 is reflected off mirror 812 through a wave plate 816 and into cube 818. Variable wave plate 816 and cube 818 function analogously to beam splitting assembly 310 discussed above in conjunction with FIG. 3. Indeed, in a preferred embodiment of the present invention, a beam splitting assembly nearly identical to beam splitter 310 is used in copy system 900 in lieu of wave plate 816 and cube 818; however, for the sake of clarity, the beam splitting apparatus is schematically represented as cube 818 and wave plate 816 in FIG. 9.

Beam splitting cube 818 splits source beam 825 into an S polarized object beam 806 and a P polarized reference beam 852. Object beam 806 passes through a wave plate 814 which converts beam 806 to a P polarized beam, which then passes through a beam expanding assembly 813 including a pin-hole (not shown); reference beam 852 passes through a similar beam expander 821. Respective beam expanding assemblies 813 and 821 are similar in structure and function to beam expanding assembly 314 discussed above in conjunction with FIG. 3.

Object beam 806 emerges from beam expander 813 as a divergent beam which is reflected off mirror 850 and collimized by lens 832. Reference beam 852 is reflected off mirror 820 and collimized by lens 830. Note that virtual beams 802 and 856 do not exist in reality, but are merely illustrated in FIG. 9 to indicate the apparent source of the object and reference beams, respectively. Note also that object beam 806 and reference beam 852 are both pure P polarized.

The master hologram produced by camera assembly 300 and discussed above is mounted in a transparent film holder 834 and referred to in FIG. 9 as H1. A second film H2, suitably identical in structure to film substrate 319 prior to exposure, is placed on film holder 838. Object beam 806 is cast onto master hologram H1 at the Brewster's angle associated with film H1 (approximately 56°).

With momentary reference to FIG. 12B, hologram H1 embodies fringe patterns which diffract incident light as a function of incident wavelength. Since hologram H1 was produced with light having the same wavelength as monochromatic object beam 806, we expect hologram H1 to diffract the object beam by the same amount. Hence, object beam 806 emerges from hologram H1 after being diffracted by an average angle K and strikes film surface 840 of film H2. Reference beam 852 is directed at substrate H2 at any convenient angle, e.g., Brewster's angle (approximately 560).

Film substrate H2 records the standing wave pattern produced by object beam 806 and reference beam 852 in the same manner as described above in connection with film 319 in the context of FIGS. 3, 4, and 12A and 12B. More particularly, the plurality of images corresponding to each data slice within a data set are simultaneously recorded onto film H2. The amplitude and phase information corresponding to each date slice is accurately recorded on film H2 as that amplitude and phase information exists within the plane defined by film H2. When copy hologram H2 is subsequently replayed, as discussed in greater detail below, the image corresponding to each data slice, with its amplitude and phase information intact, accurately recreates the three-dimensional physical system defined by the data set.

In the preferred embodiment discussed herein, master holograms H1 are produced on a camera assembly 300, and copy holograms H2 are produced on a copy assembly 900. In an alternate embodiment of the present invention, these two systems may be conveniently combined as desired. For example, film holder 318 in FIG. 3 may be replaced with film holder 834 from FIG. 9, with a subsequent H2 film holder disposed such that the object beam is transmitted through film holder 834 onto the new H2 film holder. In this way, the relationship between film holders H1 and H2 (FIG. 9) would be substantially replicated in the hybrid system. To complete the assembly, an additional reference beam is configured to strike the new H2 film holder at Brewster's angle. As altered in the foregoing manner, the system can effectively produce master holograms and copies on the same rig. More particularly, the master hologram is produced in the manner described in conjunction with FIG. 3 and, rather than utilizing a separate copy rig, the master hologram may simply be removed from its film holder, inverted, and utilized to create a copy hologram. Of course, the original object beam would be shunted, and replaced by a newly added reference beam configured to illuminate newly added film holder H2.

As also discussed above, the present invention contemplates, for a data set comprising N slices, recording N individual, relatively weak holograms onto a single film substrate. To a first approximation, each of the N slices will consume (convert) approximately 1/N of the silver halide grains consumed during exposure.

As a starting point, the total quantity of photosensitive elements within a film substrate may be inferred by sequentially exposing the film, in a conventional photographic manner, to a known intensity of light and graphing the extent to which silver halide grains are converted to silver grains as a function of applied energy (intensity multiplied by time). With particular reference to FIG. 2A, the well-known HD curve for four exemplary film samples illustrate the effect of exposing film to a predetermined intensity of light over time. At various time intervals, the extent to which the film is fogged, i.e. the extent to which silver halide grains are converted to silver grains, is measured by simply exposing the film to a beam of known intensity, developing the film, and measuring the amount of light which passes through the film as a function of incident light. Although typical HD curves are nonlinear, they may nonetheless be used in the context of the present invention to ascertain various levels of fog as a function of applied energy.

In accordance with the present invention, the HD curve for a particular film (generally supplied by the film manufacturer) is used to determine the amount of light, expressed in microjoules per square cm, necessary to prefog the film to a predetermined level, for example, to 10% of the film's total fog capacity as determined by the HD curve. After prefogging the film to a known level, a very faint, plane grating hologram is recorded onto the film, and the diffraction efficiency of the grating measured. Thereafter, a different piece of film from the same lot of film is prefogged to a higher level, for example to 20% of its total fog capacity based on its HD curve, and the same faint hologram superimposed on the fogged film. The diffraction efficiency of the faint hologram is again measured, and the process repeated for various fog levels. The diffraction efficiency of the grating for each fog level should be essentially a function of the pre-fog level, inasmuch as the prefogging is wholly random and does not produce fringe patterns of any kind.

Referring now to FIG. 2B, a graph of diffraction efficiency as a function of fog level (bias energy) is shown for a particular lot of film. Note that the curve in FIG. 2 extends until the film is holographically saturated, that is, until a level of prefog is reached at which the diffraction efficiency of subsequent faint holograms reaches a predetermined minimum value. The area under the curve in FIG. 2 corresponds to the total energy applied to the film until its diffraction efficiency is saturated. In the present context, this energy is equivalent to the product of the intensity of the incident light and the total time of exposure.

For a particular film lot, the area under the curve in FIG. 2B effectively characterizes the film in terms of its multiple exposure holographic exposure capacity. For a data set comprising N slices, the area under the curve may be conveniently divided into N equal amounts, such that each data slice may consume 1/N of the total energy under the curve. Recalling that the energy for a particular slice is equal to the product of the intensity of the incident light and time of exposure, and further recalling that the intensity of the incident light (e.g., object beam) is determined for each slice in the manner described below in connection with the beam ratio determination, the time of exposure for every slice may be conveniently determined.

In accordance with a further aspect of the present invention, each lot of film may be conveniently coded with data corresponding to that represented in FIG. 2B. Analogously, most conventional 35 mm film is encoded with certain information regarding the film, for example, data relating to the exposure characteristics of the film. In a similar way, the information pertaining to the diffraction efficiency curve shown in FIG. 2B may be conveniently appended to each piece of holographic film for use in the present invention, for example by applying to the film or to the packaging therefor. The computer (not shown) used to control camera assembly 300 may be conveniently configured to read the data imprinted on the film, and may thereafter use this data to compute the exposure time for each data slice in the manner described herein.

As stated above, the relative intensities of the reference beam to the object beam at the film plane is known as the beam ratio. Known holographic techniques tend to define beam ratio without reference to a polarization state; however, a more meaningful definition of the term, particularly in the context of the present invention, surrounds the relative intensities of the reference and object beams (at the film plane) at a particular common polarization state, i.e. either a common P polarization state or a common S polarization state.

For purposes of understanding the role of beam ratio in the present invention, it is helpful to point out that holography may be conveniently divided into display holography, in which the hologram is intended to show a three-dimensional image of a selected object, and Holographic Optical Elements (HOE) in which a basic holographic fringe pattern is recorded on a film which thereafter functions as an optical element having well-defined properties, for example, as a lens, mirror, prism, or the like.

HOEs are formed with simple directional beams leading to simple repetitive fringe patterns which tend to dominate weak secondary fringes which are also formed by scattered and reflected light within the emulsion. Since the secondary fringe patterns are typically ignored to the first approximation, conventional holographic theory states that to achieve the strongest interference between the two beams, a beam ratio of one should be employed.

In display holography, on the other hand, while the reference beam is still a simple directional beam, the object beam can be extremely complex, having intensity and direction variations imposed by the object. In addition, objects typically exhibit any number of bright spots which diffuse light at fairly high intensities. The resulting fringe pattern is extremely complex, bearing no simple relationship to the object being recorded. Moreover, the bright spots (highlights) on the object act as secondary reference beams, producing unwanted fringe patterns as they interfere with the reference beam and with each other, resulting in many sets of noise fringes, effectively reducing the relative strength of the primary fringe pattern. The resulting "intermodulation" noise (also referred to as self-referencing noise) causes an unacceptable loss of image quality unless it is suppressed.

Conventional holographic theory states that intermodulation noise may be suppressed by increasing the relative strength of the reference beam, with respect to the object beam, by selecting a beam ratio in the range of three to 30, and most typically between five and eight. This results in strong primary fringes and greatly reduced secondary fringes (intermodulation noise). Thus, existing holographic techniques suggest that, in the context of display holography, a beam ratio higher than unity and preferably in the range of 5–8:1 substantially reduces intermodulation noise.

The diffraction efficiency of a hologram, i.e. how bright the hologram appears to an observer, also exhibits a maximum at a beam ratio of one. At beam ratios higher than one, the diffraction efficiency falls off, resulting in less bright holograms when replayed. The conventional wisdom in existing holographic theory, however, states that since intermodulation noise falls off faster than diffraction efficiency as the beam ratio increases, a beam ratio of between 5–8:1 minimizes intermodulation noise (i.e. yields a high signal to noise ratio) while at the same time producing holograms exhibiting reasonable diffraction efficiency.

In the context of the present invention, a very low beam ratio, on the order of unity, is desirably employed, resulting in a maximum diffraction efficiency for each hologram associated with every data slice in a particular data set. In the context of the present invention, however, intermodulation noise (theoretically maximum at unity beam ratio) does not pose a significant problem as compared to conventional display holography. More particularly, recall that intermodulation noise in conventional holography results from, inter alia, bright spots associated with the objects. In the present invention, the "objects" correspond to a two-dimensional, windowed, gamma-corrected (discussed below) data slice. Thus, the very nature of the data employed in the context of the present invention results in inherently low intermodulation noise, thus permitting the use of a unity beam ratio and permitting maximum diffraction efficiency and very high signal to noise ratio images.

Moreover, the selection of a unity beam ratio for each slice in a data set may be accomplished quickly and efficiently in the context of a preferred embodiment of the present invention.

More particularly, variable wave plate 404 may be calibrated by placing a photo diode in the path of the reference beam near film 319 while shunting the object beam, and vice versa. As the applied voltage to wave plate 404 is ramped up at predetermined increments from zero to a maximum value, the intensity of the reference beam may be determined as a function of input voltage. Since the intensity of the reference beam, plus the intensity of the object beam (before a data slice is incorporated into the object beam) is approximately equal to the intensity of their common source beam and the intensity of the common source beam is readily ascertainable, the pure object beam intensity as a function of voltage applied to wave plate 404 may also be conveniently derived. It remains to determine the proper input voltage to wave plate 404 to arrive at a unity beam ratio for a particular slice.

At a fundamental level, each data slice comprises a known number of "pixels" (although not literally so after having passed through imaging assembly 328), each pixel having a known grey level value. Thus, each data slice may be assigned a brightness value, for example, as a percent of pure white. Thus, the particular voltage level required to obtain a unity beam ratio for a particular data slice having a known brightness value may be conveniently determined by selecting the unique voltage value corresponding to a pure object beam intensity value which, when multiplied by the brightness value, is equal to the reference beam intensity value for the same voltage level. This computation may be quickly and efficiently carried out by a conventional computer programmed in accordance with the relationships set forth herein.

Accordingly, each data slice has associated therewith a voltage value corresponding to the input voltage to wave plate 404 required to achieve a unity beam ratio.

In accordance with another aspect of the present invention, each data slice comprising a data set may be further prepared subsequent to the windowing procedures set forth above. In particular, imaging assembly 328 generates an image comprising various brightness levels (grey levels) in accordance with data values applied to CRT 444. However, it is known that conventional CRTs and conventional light valves do not necessarily project images having brightness levels which linearly correspond to the data driving the image. Moreover, human perception of grey levels is not necessarily linear. For example, while an image having an arbitrary brightness value of 100 may look twice as bright as an image having a brightness value of 50, an image may require a brightness level of 200 to appear twice as bright as the image having a brightness value of 100.

Because human visual systems generally perceive brightness as an exponential function, and CRTs and light valves produce images having brightnesses which are neither linearly nor exponentially related to the levels of the data driving the images, it is desirable to perform a gamma correction on the data slices after they have been windowed, i.e. after they have been adjusted at a gross level for brightness and contrast levels. By gamma correcting the windowed data, the grey levels actually observed are evenly distributed in terms of their perceptual differences.

In accordance with a preferred embodiment of the present invention, a gamma lookup table is created by displaying a series of predetermined grey level values with imaging assembly 328. A photo diode (not shown) is suitably placed in the path of the output of imaging assembly 328 to measure the actual brightness level corresponding to a known data value. A series of measurements are then taken for different brightness levels corresponding to different grey level data values, and a gamma lookup table is constructed for the range of grey values exhibited by a particular data set. Depending on the degree of precision desired, any number of grey level values may be measured with the photo diode, allowing for computer interpolation of brightness levels for grey values which are not measured optically.

Using the gamma lookup table, the data corresponding to each data slice is translated so that the brightness steps of equal value in the data correspond to visually equivalent changes in the projected image, as measured by the photo diode during creation of the lookup table.

Moreover, light valve 442, when used in conjunction with wave plate 463 as discussed in the context of FIGS. 7 and 8, is typically capable of producing a blackest black image on the order of about 2000 times as faint as the brightest white image. This level of contrast range is simply unnecessary in view of the fact that the human visual system can only distinguish within the range of 50 to 100 grey levels within a single data slice. Thus, the maximum desired contrast ratio (i.e. the brightness level of the blackest region on a slice divided by the brightness level of the brightest white region on a slice) is desirably in the range of 100–200:1, allowing for flexibility at either end of the brightness scale. Since the contrast ratio of a particular slice is thus on the order of one-tenth the available contrast ratio producible by the light valve, a further aspect of the gamma correction scheme employed in the context of the present invention surrounds defining absolute black as having a brightness level equal as near to zero as achievable. Thereafter, a subjective determination is made that the darkest regions of interest on any slide, i.e. the darkest region that a radiologist would be interested in viewing on a slice, would be termed "nearly black." These nearly black regions would be mapped to a value which is on the order of 100–200 times fainter than pure white. Moreover, any values below the nearly black values are desirably clamped to absolute black (zero grey value). These absolute black regions, or super black regions, comprise all of the regions of a slice which are darker than the darkest region of interest.

An additional gamma correction step employed in the present invention surrounds clamping the brightest values. Those skilled in the art will appreciate that conventional CRTs and light valves are often unstable at the top of the brightness range. More particularly, increasing the brightness level of data driving an image in any particular CRT/ light valve combination above the 90% brightness level may yield images having very unpredictable brightness levels. Thus, it may be desirous to define the upper limit of brightness level for a data set to coincide with a predetermined brightness level exhibited by imaging assembly 328, for example, at 90% of the maximum brightness produced by imaging assembly 328. Thus, pure white as reflected in the various data slices will actually correspond to 10% less white than imaging assembly 328 is theoretically capable of producing, thereby avoiding nonlinearities and other instabilities associated with the optical apparatus.

Finally, if any slice is essentially black or contains only irrelevant data, the slice may be omitted entirely from the final hologram, as desired.

VIEWING ASSEMBLY.

Copy hologram H2 is suitably replayed on a viewing device such as the VOXBOX® viewing apparatus manufactured by VOXEL, Inc. of Laguna Hills, Calif. Certain features of the VOXBOX® viewing apparatus are described in U.S. Pat. Nos. 4,623,214 and 4,623,215 issued Nov. 18, 1986.

Referring now to FIG. 11, an exemplary viewing apparatus 1102 suitably comprises a housing 1104 having an internal cavity 1106 disposed therein, housing 1104 being configured to prevent ambient or room light from entering the viewing device.

Viewing apparatus 1102 further comprises a light source 1108, for example a spherically irradiating white light source, a baffle 1132, a mirror 1134, a Fresnel lens 1110, a diffraction grating 1112, and a Venetian blind 1114 upon which copy hologram H2 is conveniently mounted. Venetian blind 1114 and hologram H2 are schematically illustrated as being separated in space from diffraction grating 1112 for clarity; in a preferred embodiment of the device, Fresnel lens 1110 suitably forms a portion of the front surface of housing 1104, diffraction grating 1112 forms a thin, planar sheet secured to the surface of lens 1110, and Venetian blind 1114 forms a thin, planar sheet secured to grating 1112. Hologram H2 is suitably removably adhered to Venetian blind 1114 by any convenient mechanism, for example by suitable clips, vacuum mechanisms, or any convenient manner which permits hologram H2 to be intimately yet removably bonded to the surface of Venetian blind 1114.

Fresnel lens 1110 collimates the light produced by light source 1108 and directs the collimated beam through diffraction grating 1112. The desired focal length between source 1108 and lens 1110 will be determined by, inter alia, the physical dimensions of lens 1110. In order to conserve space and thereby produce a compact viewing box 1102, the light from source 1108 is suitably folded along its path by mirror 1134. Since source 1108 may be placed near lens 1110 in order to maximize space utilization, baffle 1132 may be conveniently disposed intermediate source 1108 and lens 1110, such that only light which is folded by mirror 1134 strikes 1110. In a preferred embodiment of the present invention, the focal length of lens 1110 is approximately 12 inches.

Diffraction grating 1112 suitably comprises a holographic optical element (HOE), for example one produced by a holographic process similar to that described herein. More particularly, diffraction grating 1112 is suitably manufactured using a reference and an object beam having a wavelength and incident angle which corresponds to that used in producing hologram H2 (here 514.5 nm). As discussed above, the relationship between this angle and wavelength are similarly governed by the equation $\lambda = K \sin \theta$. In a preferred embodiment, diffraction grating 1112 is advantageously a phase hologram.

Diffraction hologram 1112 suitably diffracts the various components of the white light incident thereon from source 1108 as a function of wavelength. More particularly, each wavelength of light will be bent by a unique angle as it travels through diffraction grating 1112. For example, the blue component of the white light will bend through an angle P; the higher wavelength green light component is bent at a greater angle Q; and the higher wavelength red light is bent at an angle R. Stated another way, diffraction grating 1112 collimizes each wavelength at a unique angle with respect to the surface of the grating. Those skilled in the art will appreciate, however, that diffraction grating 1112 is an imperfect diffractor; thus, only a portion of the incident light is diffracted (e.g., 50%), the remainder of the undiffracted light passes through as collimated white light.

Venetian blind (louvers) 1114 comprises a series of very thin, angled optical slats which effectively trap the undiffracted white light passing through grating 1112. Thus, substantially all of the light passing through louvers 1114 passes through at an angle, for example the angle at which the light was diffracted by grating 1112. Of course, a certain amount of light will nonetheless be deflected by the louvers and pass through at various random angles.

Moreover, the geometry of the slats comprising louvers 1114 may be selected to produce a resulting hologram with optimum colorization. More particularly, the slat geometry may be selected so that certain wavelengths pass through louvers 1114 essentially intact (the nominal wave band), whereas wavelengths higher or lower than the nominal wavelength will be clipped by the louvers. Moreover, the geometry of the slats may be selected such that light which passes through grating 1112 undiffracted does not pass directly through louvers 1114. By coordinating the slat geometry, undiffracted light may be substantially attenuated, for example, by causing such undiffracted light to reflect a number of times (e.g., four) between adjacent slats before reaching hologram H2.

Louvers 1114 suitably comprise a thin, planar light control film manufactured by the 3M Company. On one surface, louvers 1114 are slightly convex; moreover, a greasy or waxy substance is apparently applied to this surface by the manufacturer. To avoid damage to the delicate slats, it may be desirable to adhere the louvers to a protective surface, for example, an acrylic sheet (not shown). Improper application of the "greasy" side of louvers 1114 to an acrylic sheet may, however, produce a nonuniform contact interface between the two surfaces, which could produce undesirable optical characteristics.

The present inventor has determined that applying a thin coating of a high-lubricity particulate substance (e.g., talc) at this interface tends to yield a contact surface between the acrylic sheet and the louvers having improved optical characteristics.

Hologram H2 is illustratively adhered to the surface of louvers 1114. Since hologram H2 is suitably produced using the same wavelength and reference beam angle as was used to produce grating 1112, light passing through hologram H2 is bent in accordance with its wavelength. Specifically, blue light is bent at an angle of minus P, green light is bent at an angle of minus Q, and red light is bent at an angle of −R (recall that master hologram H1 was inverted during the production of copy hologram H2). Consequently, all wavelengths pass through hologram H2 substantially orthogonally to the plane of lens 1110. As a result, an observer 1116 may view the reconstructed hologram from a viewpoint substantially along a line orthogonal to the plane of hologram H2.

By coordinating the wavelength-selective diffraction capacity of diffraction grating 1112 with the wavelength-selective diffraction properties of hologram H2, substantially all of the light diffracted by diffraction grating 1112 may be used to illuminate the hologram. Thus, even the use of a relatively inefficient diffraction grating 1112 produces a relatively bright holographic image. Moreover, the holographic image is not unnecessarily cluttered by spurious white light which is not diffracted by grating 1112, in as much as a substantial amount of this spurious light will be blocked by louvers 1114.

Moreover, by mounting the thin, planar hologram, louvers, and diffraction grating on the surface of a lens which forms a portion of the viewing apparatus, the replay beam used to illuminate the hologram is substantially exclusively limited to the collimized light from source 1108; that is, spurious noncollimated light is prevented from striking the rear surface (right-hand side in FIG. 11) of hologram H2.

When a hologram (H2), produced in accordance with the present invention, is mounted on box 1102, a three-dimensional representation of the object may be seen, affording the viewer full parallax and perspectives from all viewpoints. The present inventor has further determined that the hologram may be removed from the viewbox, inverted, and placed back on the viewbox. The inverted hologram contains all of the same data as the noninverted view of the same hologram, except that the observer is looking at the hologram from the opposite direction; that is, points on the hologram which previously were furthest away from the observer are now closest to the observer, and vice versa. This feature may be particularly useful to physicians when mapping out a proposed surgical procedure, for example, by allowing the physician to assess the various pros and cons of operating on a body part from one direction or the other.

The present inventor has also determined that two or more holograms may be simultaneously viewed on the same viewbox, simply by placing one hologram on top of the other hologram. This may be particularly significant in circumstances where, for example, the first hologram comprises a body part (e.g., hip) which is to be replaced, and the second hologram comprises the prosthetic replacement device. The physician may thus view the proposed device in proper context, i.e. as the device would be implanted in the three-dimensional space within the patient.

The present inventor has also observed that very faint patterns of light and dark rings are occasionally visible when viewing a hologram in accordance with the present invention. More particularly, these rings appear to be a great distance behind the hologram when viewed. The present inventor theorizes that these rings constitute an interferogram, which results from taking a "hologram" of diffusing screen 472 along with each data slice. To overcome this problem, diffuser 472 may be shifted slightly (e.g., ten millimeters) within its own plane after each data slice is recorded. In this way, the image corresponding to each data slice is still projected onto film 319 as described herein, yet a slightly different portion of diffuser 472 is projected for each data slice, thereby avoiding projecting the same pattern attributable to diffuser 472 for each data slice.

It is also possible to add textual or graphical material, for example to one or more data slices, thus permitting the resulting hologram of the data set to reflect this textual or graphic material. Such material may comprise identification data (e.g., patient name, model or serial number of the object being recorded), or may comprise pure graphical information (arrows, symbols, and the like).

In accordance with another aspect of the present invention, it may be efficient to window only a portion of the data slices and nonetheless achieve satisfactory contrast and shading. For example, for a 100-slice data set, it may be possible to manually window every tenth data slice, for example, and through the use of computerized interpolation techniques, automatically window the interstitial data slices.

In accordance with a further aspect of the present invention, it is possible to select the film plane among the various data slice planes comprising the data set. More particularly, each data slice within a data set occupies its own unique plane. In accordance with the preferred embodiment of the present invention, track assembly 334 is moved forward or backward such that the data slice which is centered within the volume of the data set corresponds to the data slice centered within the length of travel of track assembly 334. The relative position of imaging assembly 328 and film 319 may be varied, however, so that the plane of film 319 is located nearer to one end of the data set or the other, as desired. The resulting hologram H2 will thus appear to have a greater or lesser portion of the holographic image projected into or out of the screen upon which the hologram is observed, depending on the position that the film plane has been selected to cut through the data set.

In accordance with a further aspect of the invention, a plurality of different holograms may be displayed on a single sheet. For example, a hologram of a body part before surgery may be displayed on the upper portion of a film, with the lower portion of the film being divided into two quadrants, one containing a hologram of the same body part after surgery from a first perspective, and the other portion containing a view of the same body part after surgery from another perspective. These and other holographic compositions may be suitably employed to facilitate efficient diagnostic analysis.

In accordance with a further aspect of the present invention, the entire beam path is advantageously enclosed within black tubing or black boxes, as appropriate. This minimizes the presence of undesirable reflections. Moreover, the entire process of making master and copy holograms is advantageously carried out in a room or other enclosure which is devoid of spurious light which could contact any film surface. Alternatively, the path traveled by any of the beams in the context of the present invention may be replaced with fiber optic cable. By proper selection of the fiber optic cable, the polarization and Transverse Electromagnetic Mode (TEM) of the light traveling through the cable is preserved. Use of fiber optic cable permits the system to be highly compressed, and further permits the elimination of many of the components of the system entirely (e.g., mirrors). Finally, fiber optic cables may be used to compensate for a differential path length between the reference beam and the object beam. Specifically, to the extent the path traveled by one of the beams differs from the other, a predetermined length of fiber optic cable may be employed in the path of the beam traveling the shorter length to compensate for this difference in length and, hence, render the two paths equal.

Although the invention has been described herein in conjunction with the appended drawings, those skilled in the art will appreciate that the scope of the invention is not so limited. For example, while the view box has been described as being rectangular, those skilled in the art will appreciate that any suitable mechanical configuration which conveniently houses the various components of the viewing apparatus will suffice. Moreover, although the camera and copy assemblies are illustrated as separate systems, they may suitably be combined into a single system.

These and other modifications in the selection, design, and arrangement of the various components and steps discussed herein may be made without departing from the spirit of the invention as set forth in the appended claims.

I claim:

1. An apparatus for making holograms, comprising:
   a reference beam source for generating a reference beam;
   an object beam source for generating an object beam;
   a substrate holder disposed in the beam paths of the beams generated by said reference beam source and said object beam source;
   object projection assembly for sequentially projecting multiple two-dimensional images upon said substrate holder;
   means for controlling the effective exposure energy of each image;
   means for varying the distance between said projection assembly and said substrate holder, such that each of said two dimensional images is projected onto said substrate holder at a predetermined respective distance from said substrate holder; and,
   a second means for controllably varying a beam splitter assembly to allocate said source beam into said reference and said object beam in accordance with the image content of a plurality of data slices.

2. The apparatus of claim 1, wherein said distance varying means comprises a track, wherein said object projection assembly is mounted on said track.

3. The apparatus of claim 1, wherein said distance varying means comprises a track, wherein said substrate is mounted on said track.

4. The apparatus of claim 1, wherein said reference beam source includes means for polarizing said reference beam.

5. The apparatus of claim 1, wherein said object beam source includes means for polarizing said object beam.

6. The apparatus of claim 1, wherein said reference beam source further includes means for diminishing noise in said reference beam.

7. The apparatus of claim 6, wherein said noise diminishing means includes:
   means for focusing said reference beam; and
   an aperture in the beam path of said reference beam.

8. The apparatus of claim 1, wherein said object projection assembly comprises a spatial light modulator located in the beam path of said object beam.

9. The apparatus of claim 8, wherein said object projection assembly further comprises a cathode ray tube (CRT) for projecting images onto said spatial light modulator.

10. The apparatus of claim 8, wherein said spatial light modulator is a liquid crystal light valve.

11. The apparatus of claim 1, further comprising a reference optics assembly configured to apply said reference beam at a fixed reference angle to a single film substrate, said single film substrate comprising a photosensitive emulsion substantially uniformly distributed on a surface of a thin, planar film.

12. The apparatus of claim 1, wherein said projection assembly being further configured to consecutively modulate said object beam in accordance with each of a plurality of data slices, respectively, and to direct said modulated object beams through a diffusing screen, said diffusing screen being disposed to apply said modulated object beams into said emulsion.

13. The apparatus of claim 1, wherein said varying means further comprises a means for applying each of a plurality of data slices at a single film substrate, and for simultaneously maintaining a fixed angular relationship between said single film substrate and modulated object beams.

14. The apparatus of claim 1, further comprising a computing means for calculating, based on the image content of each of a plurality of data slices representative of an internal body part, the duration for which each corresponding modulated object beam is applied to a single film substrate, to thereby record respective holograms within an emulsion for each of said data slices.

15. The apparatus of claim 14, further comprising means for estimating the aggregate exposure capacity for a single film substrate, and for applying indicia of said exposure capacity to said computing means.

16. The apparatus of claim 15, wherein said estimating means comprises:
   means for applying a predetermined exposure energy to a second single film substrate having photosensitive properties similar to a first single film substrate;

means for thereafter recording a known fringe pattern onto said second single film substrate; and means for measuring the diffraction efficiency of said fringe pattern.

17. The apparatus of claim 1, further comprising a first means for maintaining a substantially constant reference to object beam ratio for each of said holograms corresponding to a plurality of said data slices representative of an internal body part.

18. The apparatus of claim 1, further including a means for pre-processing the images corresponding to a data set of said hologram, and further wherein said data set comprises at least 200 data slices.

19. The apparatus of claim 18, wherein said pre-processing means includes at least one of a means for cropping, windowing, compositing, and reformatting said images.

20. The apparatus of claim 1, wherein said means for controlling the effective exposure energy of each image includes a means for controllably varying the exposure energy of each of said images as a function of image intensity.

21. The apparatus of claim 1, wherein said means for controlling the effective exposure energy of each image includes a means for maintaining substantially constant effective exposure for each two dimensional image.

* * * * *